United States Patent
Reese

(10) Patent No.: US 11,093,864 B1
(45) Date of Patent: Aug. 17, 2021

(54) DISTRIBUTABLE FEATURE ANALYSIS AND TREE MODEL TRAINING SYSTEM

(71) Applicant: SAS Institute Inc., Cary, NC (US)

(72) Inventor: Brandon Michael Reese, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/093,826

(22) Filed: Nov. 10, 2020

Related U.S. Application Data

(60) Provisional application No. 63/022,962, filed on May 11, 2020, provisional application No. 62/987,663, filed on Mar. 10, 2020.

(51) Int. Cl.
*G06N 20/00* (2019.01)
*G06F 16/23* (2019.01)

(52) U.S. Cl.
CPC ......... *G06N 20/00* (2019.01); *G06F 16/2379* (2019.01)

(58) Field of Classification Search
CPC .................................................. G06N 20/00
See application file for complete search history.

(56) References Cited

U.S. PATENT DOCUMENTS

| | | | |
|---|---|---|---|
| 2015/0012465 A1* | 1/2015 | Pingenot | G06N 5/025 706/12 |
| 2018/0189709 A1* | 7/2018 | Sullivan | G06K 9/6268 |
| 2020/0302318 A1* | 9/2020 | Hetherington | G06N 5/003 |

OTHER PUBLICATIONS

Nowozin, Improved Information Gain Estimates for Decision Tree Induction (Year: 2012).*
Singh, "Comparative Study ID3, Cart and C4.5 Decision Tree Algorithm: A Survey" (Year: 2014).*
Liu, An Embedded Feature Selection Method for Imbalanced Data Classification (Year: 2019).*
Neville, P. G., and Tan, P.-Y. (2014). "A Forest Measure of Variable Importance Resistant to Correlations." In Proceedings of the 2014 Joint Statistical Meetings . Alexandria, VA: American Statistical Association.
Breiman, L. (2001). "Random Forests." Machine Learning 45:5-32.
Brandes, Ulrik. "A faster algorithm for betweenness centrality." Journal of mathematical sociology 25.2 (2001): 163-177.
SAS Viya Data Mining and Machine Learning, Procedures Guide, SAS Institute, 2016.

(Continued)

*Primary Examiner* — Li B. Zhen
*Assistant Examiner* — Tewodros E Mengistu
(74) *Attorney, Agent, or Firm* — Bell & Manning, LLC

(57) ABSTRACT

A computing system computes a variable relevance using a trained tree model. (A) A next child node is selected. (B) A number of observations associated with the next child node is computed. (C) A population ratio value is computed. (D) A next leaf node is selected. (E) First observations are identified. (F) A first impurity value is computed for the first observations. (G) Second observations are identified when the first observations are associated with the descending child nodes. (H) A second impurity value is computed for the second observations. (I) A gain contribution is computed. (J) A node gain value is updated. (K) (D) through (J) are repeated. (L) A variable gain value is updated for a variable associated with the split test. (M) (A) through (L) are repeated. (N) A set of relevant variables is selected based on the variable gain value.

30 Claims, 11 Drawing Sheets

(56) References Cited

OTHER PUBLICATIONS

SAS Enterprise Miner 14.3 High-Performance Procedures, SAS Institute, 2017.
Solved: Random Branch Assignment s (RBA)—SAS Support Communities, Mar. 10, 2020.
Wikipedia, Decision Tree Learning, last edited Aug. 7, 2020, retrieved from https://en.wikipedia.org/w/index/php?title=Decision_tree_learning&oldid=971585991.
CORA, Relational Dataset Repository, printed Oct. 12, 2020.
SAS Visual Data Mining and Machine Learning 8.5, SAS Institute 2019.
Sklearn.datasets.make_classification, 2007-2020 scikit-learn developers.
SAS Enterprise Miner and SAS Text Miner Procedures Reference for SAS 9.4, Fourth Edition, SAS Documentation, Jul. 28, 2020.

* cited by examiner

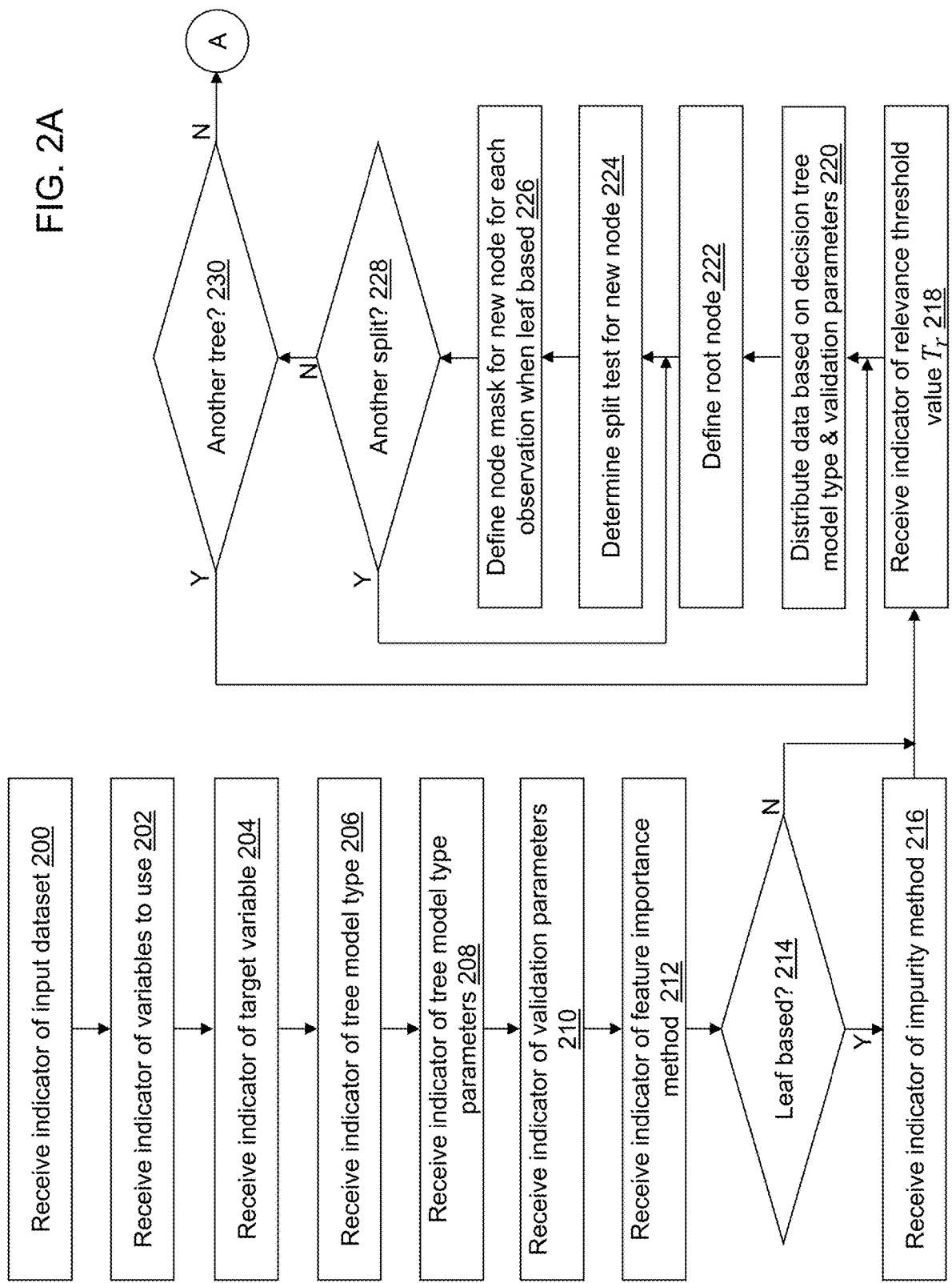

| Case (402) | Classes (404) | Informative (406) | Garbage (408) | Interaction (410) | Interaction Type (412) | Top N (414) | Trees (416) | Threshold (418) |
|---|---|---|---|---|---|---|---|---|
| 1 | 8 | 0 | 40 | 25 | Additive | 30 | 50 | 1.11 |
| 2 | 8 | 10 | 60 | 25 | Additive | 40 | 50 | 0.86 |
| 3 | 8 | 0 | 40 | 25 | Additive | 40 | 50 | 1.34 |
| 4 | 8 | 5 | 60 | 25 | Additive | 25 | 50 | 33.5 |
| 5 | 4 | 5 | 60 | 25 | Additive | 40 | 50 | 2.61 |
| 6 | 8 | 10 | 60 | 25 | Additive | 55 | 250 | 3.14 |
| 7 | 8 | 0 | 40 | 25 | Categorical | 30 | 50 | 3.05 |
| 8 | 8 | 10 | 60 | 25 | Categorical | 40 | 50 | 0.59 |
| 9 | 8 | 0 | 40 | 25 | Categorical | 40 | 50 | 0.71 |
| 10 | 4 | 5 | 60 | 25 | Categorical | 25 | 50 | 1.21 |
| 11 | 8 | 5 | 60 | 25 | Categorical | 40 | 50 | 0.79 |
| 12 | 3 | 10 | 60 | 25 | Categorical | 55 | 250 | 2.12 |
| 13 | 3 | 0 | 40 | 25 | Additive | 30 | 50 | 1.65 |
| 14 | 3 | 10 | 60 | 25 | Additive | 40 | 50 | 1.65 |
| 15 | 2 | 0 | 40 | 25 | Additive | 40 | 50 | 0.73 |
| 16 | 2 | 5 | 60 | 25 | Additive | 25 | 50 | 15.4 |
| 17 | 2 | 5 | 60 | 25 | Additive | 40 | 50 | 1.55 |
| 18 | 2 | 10 | 60 | 25 | Additive | 55 | 250 | 4.16 |

| Case | Leaf Based Accuracy | Split Based Accuracy | All Features Accuracy | Leaf Based Garbage | Split Based Garbage | All Features Garbage |
|---|---|---|---|---|---|---|
| 1 | 61.9 ± 0.7 | 58.7 ± 0.6 | 70.4 ± 0.5 | 0 | 0 | 40 |
| 2 | 59.1 ± 0.9 | 59.4 ± 0.5 | 64.2 ± 0.6 | 0 | 1 | 60 |
| 3 | 68.4 ± 0.6 | 65.6 ± 0.6 | 70.2 ± 0.7 | 0 | 0 | 40 |
| 4 | 48.3 ± 0.7 | 48.7 ± 0.7 | 65.3 ± 0.7 | 0 | 0 | 60 |
| 5 | 87.9 ± 0.4 | 87.5 ± 0.4 | 90.0 ± 0.4 | 1 | 2 | 60 |
| 6 | 65.3 ± 0.7 | 66.3 ± 0.7 | 64.2 ± 0.7 | 6 | 7 | 60 |
| 7 | 17.2 ± 0.6 | 17.0 ± 0.6 | 22.4 ± 0.9 | 16 | 16 | 60 |
| 8 | 32.7 ± 0.6 | 32.9 ± 0.6 | 28.5 ± 0.6 | 14 | 16 | 40 |
| 9 | 19.2 ± 0.7 | 17.2 ± 0.7 | 22.8 ± 0.7 | 7 | 9 | 60 |
| 10 | 24.8 ± 0.6 | 25.3 ± 0.6 | 25.1 ± 0.9 | 18 | 17 | 40 |
| 11 | 38.8 ± 0.6 | 39.9 ± 0.6 | 46.8 ± 0.5 | 24 | 24 | 60 |
| 12 | 32.6 ± 0.7 | 32.5 ± 0.7 | 28.8 ± 0.8 | 0 | 0 | 60 |
| 13 | 85.0 ± 0.4 | 84.6 ± 0.3 | 93.6 ± 0.3 | 1 | 1 | 40 |
| 14 | 90.5 ± 0.4 | 90.7 ± 0.3 | 93.9 ± 0.4 | 3 | 0 | 60 |
| 15 | 89.4 ± 0.4 | 91.2 ± 0.3 | 93.3 ± 0.3 | 0 | 0 | 40 |
| 16 | 88.4 ± 0.2 | 88.8 ± 0.3 | 97.2 ± 0.2 | 1 | 0 | 60 |
| 17 | 95.6 ± 0.2 | 95.9 ± 0.2 | 97.2 ± 0.2 | 0 | 0 | 60 |
| 18 | 96.9 ± 0.3 | 96.6 ± 0.2 | 96.8 ± 0.3 | 2 | 3 | 60 |
| Overall | 61.3 | 61.1 | 65.0 | 93 | 96 | 960 |

FIG. 5

DISTRIBUTABLE FEATURE ANALYSIS AND TREE MODEL TRAINING SYSTEM

CROSS-REFERENCE TO RELATED APPLICATIONS

The present application claims the benefit of and priority to 35 U.S.C. § 119(e) to U.S. Provisional Patent Application No. 63/022,962 filed May 11, 2020, the entire contents of which are hereby incorporated by reference. The present application also claims the benefit of and priority to 35 U.S.C. § 119(e) to U.S. Provisional Patent Application No. 62/987,663 filed Mar. 10, 2020, the entire contents of which are hereby incorporated by reference.

BACKGROUND

Tree based models such as decision trees, gradient boosting tree models, and random forests are commonly chosen for predictive performance and interpretability. One aspect of interpretability is explaining how a particular model arrived at its prediction. To this end, there are standard ways to quantify node contribution and feature importance or relevance in tree-based models. Node contribution indicates the contribution of a particular node in a particular tree, while feature importance indicates the contribution of a particular feature variable to the model as a whole. Split based node contribution methods define the node contribution locally considering only the node and its two children. Resampling feature importance methods compute the importance of each feature by simultaneously replacing all splits for a given feature within a tree.

A problem with these approaches is that they are unable to capture two-or-more-way interactions between features. A second problem with split-based approaches is the inherent bias that is introduced when using the same heuristic for training the tree and evaluating feature importance. A problem with resampling approaches is that they do not yield a node contribution value, but only provide a single output score per feature. Because of these limitations, both split-based and resampling methods are of little use for the purpose of model pruning. For the purpose of feature selection, split-based and resampling methods are adequate, but the use of an alternative method instead of or in addition to these existing methods can lead to more robust feature selection.

SUMMARY

In an example embodiment, a computer-readable medium is provided having stored thereon computer-readable instructions that when executed by a computing device, cause the computing device to compute a variable relevance using a tree model. A tree based model is trained using a plurality of observation vectors. Each observation vector of the plurality of observation vectors includes a value for each variable of a plurality of variables and a target value for a target variable. The tree based model defines a decision tree that includes a root node, a plurality of child nodes, and a plurality of leaf nodes. A split test is associated with the root node and each child node to define a split in observation vectors associated with a respective child node or the root node until a leaf node of the plurality of leaf nodes is reached. (A) A next child node is selected from the plurality of child nodes of the decision tree. (B) A number of observation vectors associated with the selected next child node is computed. (C) A population ratio value is computed using the computed number of observation vectors associated with the selected next child node. (D) A next leaf node is selected from the plurality of leaf nodes that descends from the selected next child node. (E) First observation vectors of the plurality of observation vectors associated with the selected next leaf node are identified. (F) A first impurity value is computed for the identified first observation vectors using an impurity function. (G) Second observation vectors of the plurality of observation vectors associated with the selected next leaf node are identified when all of the first observation vectors are associated with the child nodes of the plurality of child nodes that descend directly from the selected next child node. (H) A second impurity value is computed for the identified second observation vectors using the impurity function. (I) A gain contribution value is computed for the selected next child node using the computed population ratio value, the computed first impurity value, and the computed first impurity value. (J) A node gain value is updated for the selected next child node using the computed gain contribution value for the selected next child node. (K) (D) through (J) are repeated with each remaining leaf node of the selected next child node as the next leaf node selected in (D). (L) A variable gain value is updated for a variable of the plurality of variables associated with the split test of the selected next child node using the updated node gain value of the selected next child node. (M) (A) through (L) are repeated with each remaining child node of the plurality of child nodes as the next child node selected in (A). (N) A set of relevant variables is selected based on the updated variable gain value. The selected set of relevant variables is output.

In another example embodiment, a system is provided. The system includes, but is not limited to, a processor and a computer-readable medium operably coupled to the processor. The computer-readable medium has instructions stored thereon that, when executed by the processor, cause the system to compute a variable relevance using a tree model.

In yet another example embodiment, a method of computing a variable relevance using a tree model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 2A through 2C depict a flow diagram illustrating examples of operations performed by a tree model training application of the tree model training device of FIG. 1 in accordance with an illustrative embodiment.

FIG. 4 shows a descriptive table of synthetic datasets that are used to show the effectiveness of the tree model training application of the tree model training device of FIG. 1 in accordance with an illustrative embodiment.

FIG. 5 shows a table of results including classification accuracy and garbage feature rejection performance for each dataset of the synthetic datasets described in FIG. 4 in accordance with an illustrative embodiment.

DETAILED DESCRIPTION

Figure 1:
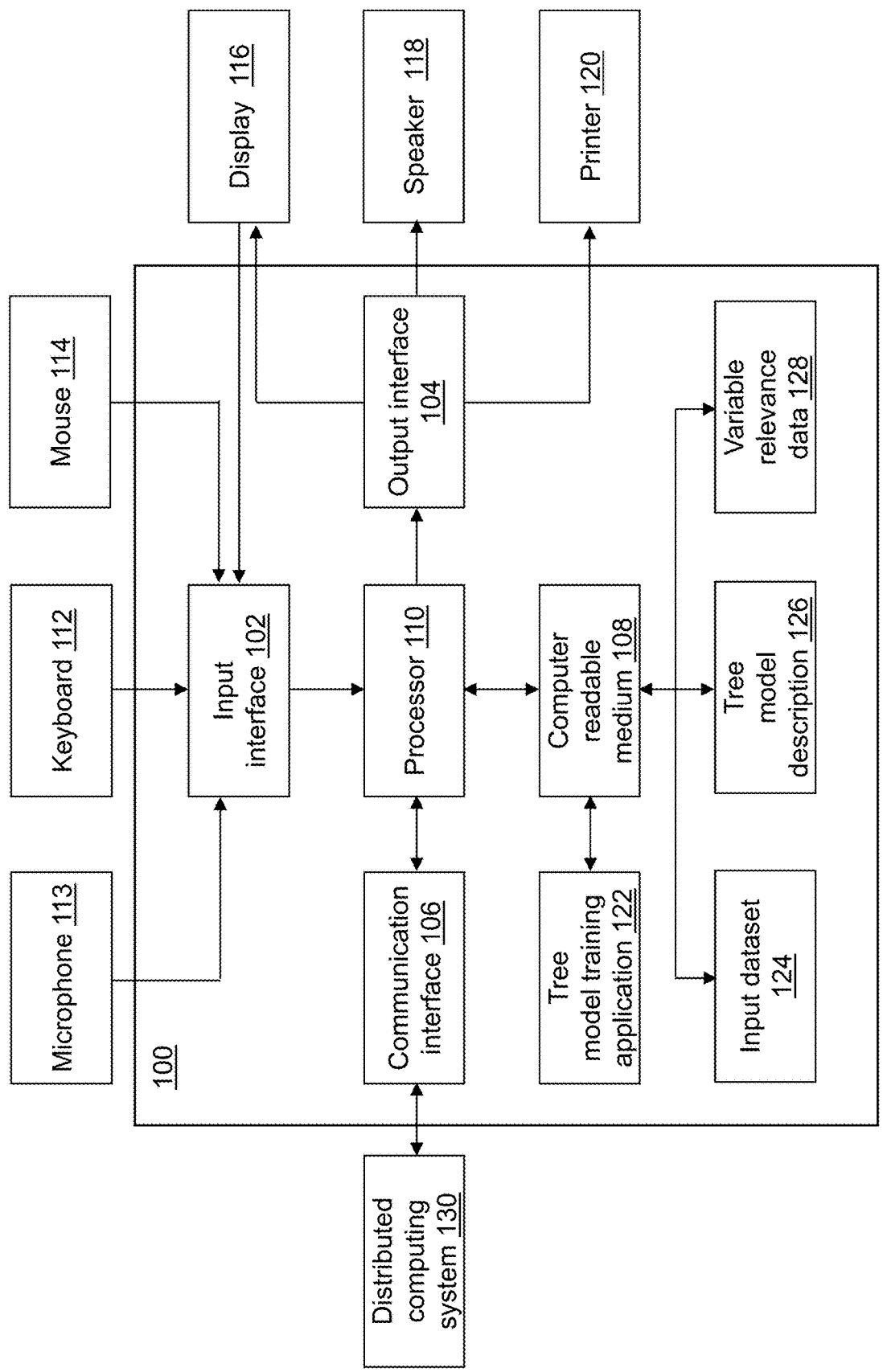
FIG. 1 depicts a block diagram of a tree model training device in accordance with an illustrative embodiment.

Referring to FIG. 1, a block diagram of a tree model training device 100 is shown in accordance with an illustrative embodiment. Tree model training device 100 may include an input interface 102, an output interface 104, a communication interface 106, a non-transitory computer-readable medium 108, a processor 110, a tree model training application 122, input dataset 124, a tree model description 126, and variable relevance data 128. Fewer, different, and/or additional components may be incorporated into tree model training device 100.

Tree model training application 122 trains a tree model and computes a feature importance or a variable relevance for each variable included in training the tree model. The feature importance computation by tree model training application 122 considers the entire tree structure of an individual tree in the tree model when computing a node contribution of each node. Existing methods either do not compute a node contribution, or they consider only immediate neighbors of the node when computing the node contribution leading to erroneous estimate of feature importance as will be discussed further below. Tree model training application 122 inherently captures the contribution of each node due to n-way feature interactions. Existing methods fail to capture these contributions at all or only for a limited value of n.

Input interface 102 provides an interface for receiving information from the user or another device for entry into tree model training device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into tree model training device 100 or to make selections presented in a user interface displayed on display 116.

The same interface may support both input interface 102 and output interface 104. For example, display 116 comprising a touch screen provides a mechanism for user input and for presentation of output to the user. Tree model training device 100 may have one or more input interfaces that use the same or a different input interface technology. The input interface technology further may be accessible by tree model training device 100 through communication interface 106.

Output interface 104 provides an interface for outputting information for review by a user of tree model training device 100 and/or for use by another application or device. For example, output interface 104 may interface with various output technologies including, but not limited to, display 116, a speaker 118, a printer 120, etc. Tree model training device 100 may have one or more output interfaces that use the same or a different output interface technology. The output interface technology further may be accessible by tree model training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Tree model training device 100 may have one or more communication interfaces that use the same or a different communication interface technology. For example, tree model training device 100 may support communication using an Ethernet port, a Bluetooth antenna, a telephone jack, a USB port, etc. Data and/or messages may be transferred between tree model training device 100 and another computing device of a distributed computing system 130 using communication interface 106.

Computer-readable medium 108 is a non-transitory electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Tree model training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Tree model training device 100 also may have one or more drives that support the loading of a memory media such as a CD, DVD, an external hard drive, etc. One or more external hard drives further may be connected to tree model training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Tree model training device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Tree model training application 122 performs operations associated with defining tree model description 126 from data stored in input dataset 124. Tree model description 126 may be used to predict a value such as a class for data stored in input dataset 124 or in a second dataset 624 (shown referring to FIG. 6). Some or all of the operations described herein may be embodied in tree model training application 122. The operations may be implemented using hardware, firmware, software, or any combination of these methods.

Referring to the example embodiment of FIG. 1, tree model training application 122 is implemented in software (comprised of computer-readable and/or computer-executable instructions) stored in computer-readable medium 108 and accessible by processor 110 for execution of the instructions that embody the operations of tree model training application 122. Tree model training application 122 may be written using one or more programming languages, assembly languages, scripting languages, etc. Tree model training application 122 may be integrated with other analytic tools. As an example, tree model training application 122 may be part of an integrated data analytics software application and/or software architecture such as that offered by SAS Institute Inc. of Cary, N.C., USA. Merely for illustration, tree model training application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Tree model training application 122 may be implemented as a Web application. For example, tree model training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input dataset 124 may include, for example, a plurality of rows and a plurality of columns. The plurality of rows may be referred to as observation vectors or records (observations), and the columns may be referred to as variables. In an alternative embodiment, input dataset 124 may be transposed. The plurality of variables define a vector $x_i$ for each observation vector i=1, 2, . . . , N, where N is a number of the observation vectors included in input dataset 124. Input dataset 124 includes a target variable value $y_i$ for each observation vector that indicates a label or class or other characteristic defined for the respective observation vector $x_i$. Input dataset data 124 includes observation vectors that have been labeled or classified, for example, by a human or other machine learning labeling process. For example, the label or classification may indicate a class for the observation vector or otherwise indicate an identification of a characteristic of the observation vector. For example, a $y_i$ value may indicate the label determined for the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc.

In data science, engineering, and statistical applications, data often consists of multiple measurements (across sensors, characteristics, responses, etc.) collected across multiple time instances (patients, test subjects, etc.). These measurements may be collected in input dataset 124 for analysis and processing or streamed to tree model training device 100 as it is generated. Input dataset 124 may include data captured as a function of time for one or more physical objects. The data stored in input dataset 124 may be captured at different time points periodically, intermittently, when an event occurs, etc. Input dataset 124 may include data captured at a high data rate such as 200 or more observation vectors per second for one or more physical objects. One or more columns of input dataset 124 may include a time and/or date value. Input dataset 124 may include data captured under normal and abnormal operating conditions of the physical object.

The data stored in input dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input dataset 124 may be generated as part of the Internet of Things (IoT), where things (e.g., machines, devices, phones, sensors) can be connected to networks and the data from these things collected and processed within the things and/or external to the things before being stored in input dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input dataset 124.

The data stored in input dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Input dataset 124 may be stored on computer-readable medium 108 or on one or more computer-readable media of distributed computing system 130 and accessed by tree model training device 100 using communication interface 106, input interface 102, and/or output interface 104. Input dataset 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input dataset 124 may be stored using various data structures as known to those skilled in the art including one or more files of a file system, a relational database, one or more tables of a system of tables, a structured query language database, etc. on tree model training device 100 or on distributed computing system 130. Tree model training device 100 may coordinate access to input dataset 124 that is distributed across distributed computing system 130 that may include one or more computing devices. For example, input dataset 124 may be stored in a cube distributed across a grid of computers as understood by a person of skill in the art. As another example, input dataset 124 may be stored in a multi-node Hadoop® cluster. For instance, Apache™ Hadoop® is an open-source software framework for distributed computing supported by the Apache Software Foundation. As another example, input dataset 124 may be stored in a cloud of computers and accessed using cloud computing technologies, as understood by a person of skill in the art. The SAS® LASR™ Analytic Server may be used as an analytic platform to enable multiple users to concurrently access data stored in input dataset 124. The SAS Viya open, cloud-ready, in-memory architecture also may be used as an analytic platform to enable multiple users to concurrently access data stored in input dataset 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2B:
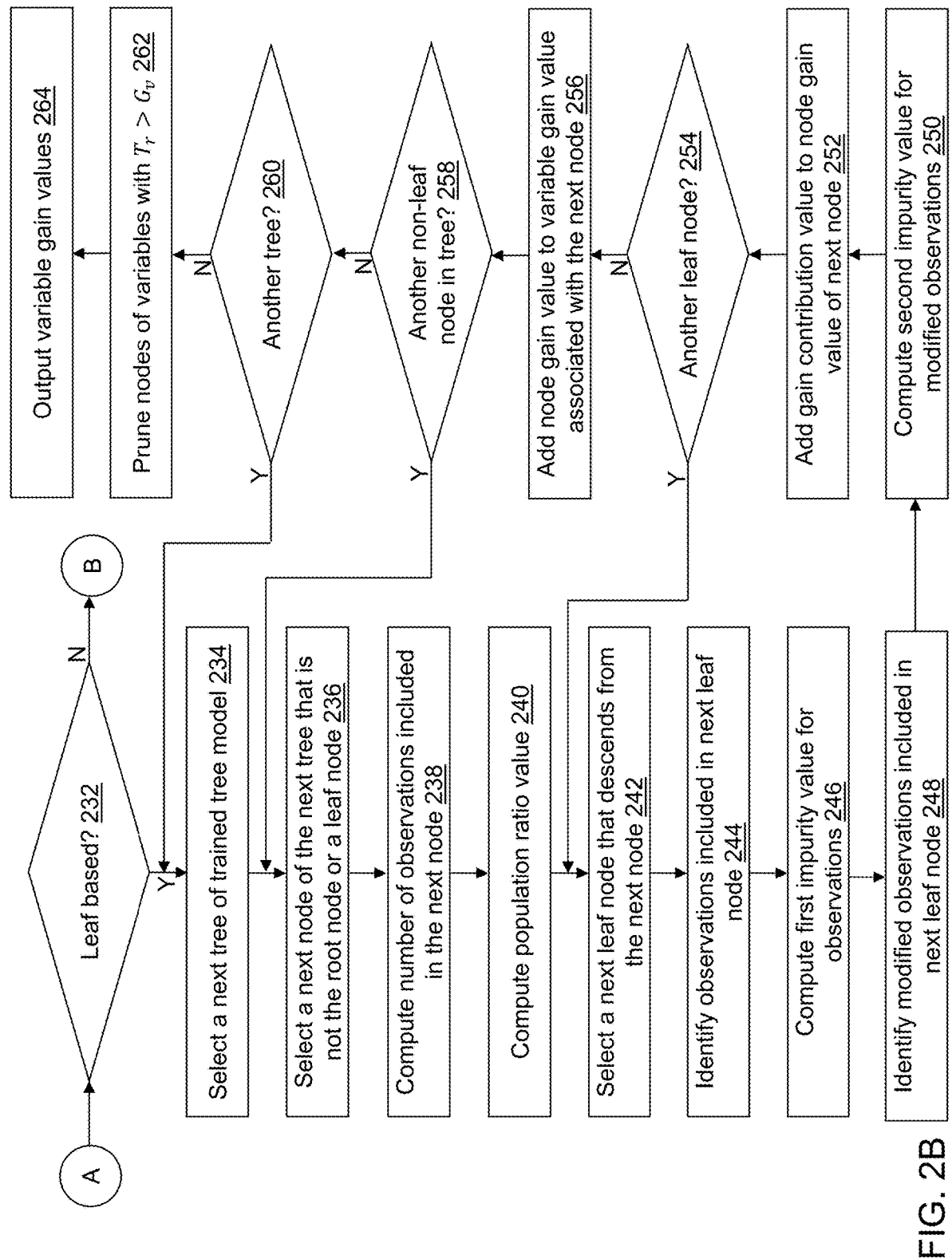
Figure 2C:
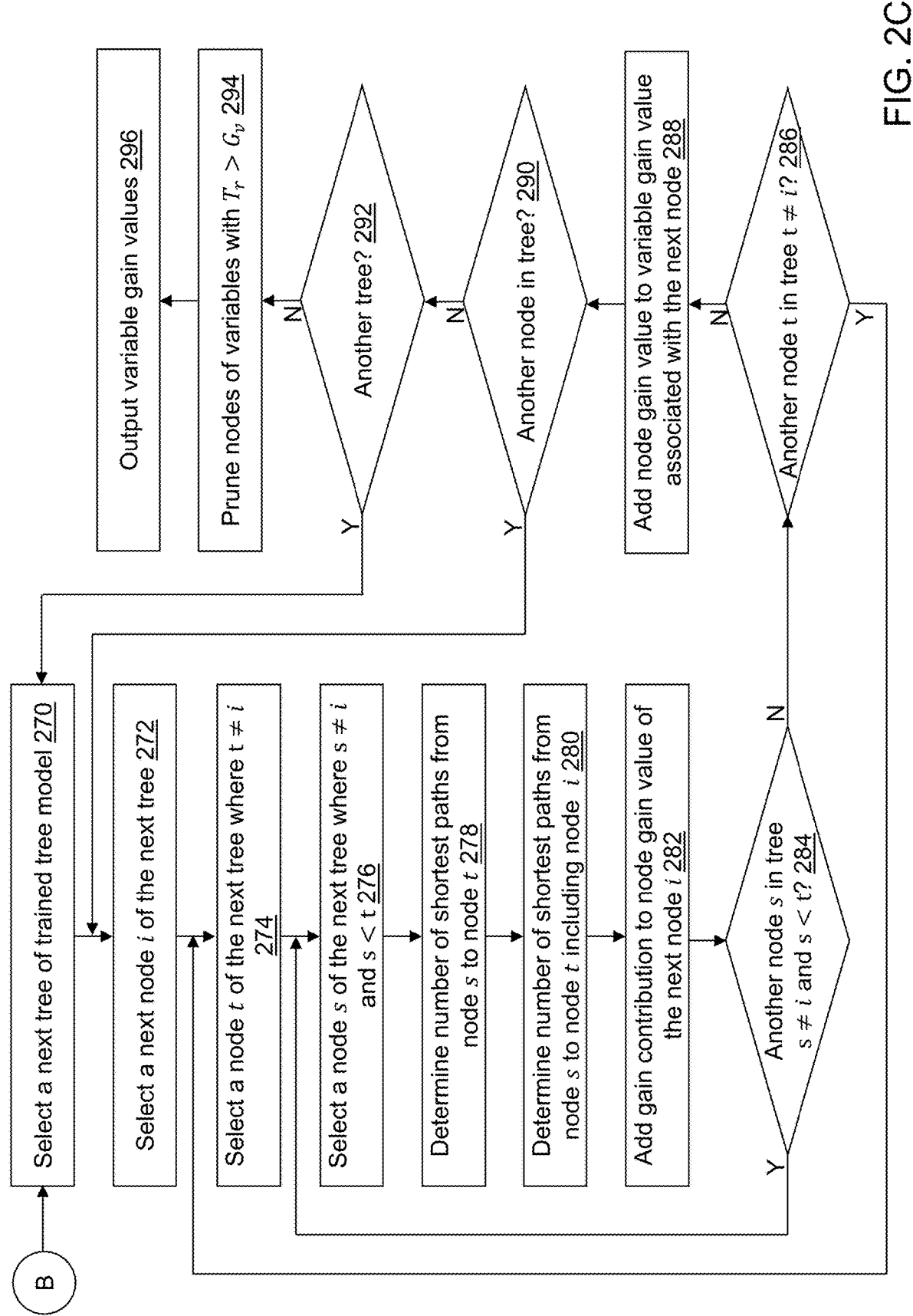

Referring to FIGS. 2A through 2C, example operations associated with tree model training application 122 are described when input dataset 124 is stored on tree model training device 100. Additional, fewer, or different operations may be performed depending on the embodiment of tree model training application 122. The order of presentation of the operations of FIGS. 2A through 2C is not intended to be limiting. Some of the operations may not be performed in some embodiments. Although some of the operational flows are presented in sequence, the various operations may be performed in various repetitions and/or in other orders than those that are illustrated. For example, a user may execute tree model training application 122, which causes presentation of a first user interface window, which may include a plurality of menus and selectors such as drop-down menus, buttons, text boxes, hyperlinks, etc. associated with tree model training application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by tree model training application 122.

Referring to FIG. 2A, in an operation 200, a first indicator may be received that indicates input dataset 124. For example, the first indicator indicates a location and a name of input dataset 124. As an example, the first indicator may be received by tree model training application 122 after selection from a user interface window or after entry by a user into a user interface window. In an alternative embodiment, input dataset 124 may not be selectable. For example, a most recently created dataset may be used automatically.

In an operation 202, a second indicator may be received that indicates the plurality of variables to use in input dataset 124. For example, the second indicator may indicate one or more column numbers or one or more column names included in input dataset 124. As another option, all of the columns of input dataset 124 except a first or a last column may be assumed to be the plurality of variables. The plurality of variables are the variables that define each observation vector $x_i$. A number of the plurality of variables may be indicated by $N_v$.

In an operation 204, a third indicator may be received that indicates the target variable. For example, the third indicator may indicate a column number or a column name that stores the value for $y_i$ associated with each observation vector $x_i$ in input dataset 124. As another option, the first or the last column may be assumed to include the value for $y_i$.

In an operation 206, a fourth indicator of a tree model type may be received. For example, the fourth indicator indicates a name of a tree model type. The fourth indicator may be received by tree model training application 122 after selection from a user interface window or after entry by a user into a user interface window. As an example, a tree model type may be selected from "Decision Tree", "Forest", "Gradient Boosting Tree", etc. The tree model type may be labeled or selected in a variety of different manners by the user as understood by a person of skill in the art. In an alternative embodiment, the tree model type may not be selectable, and a single tree model type is implemented in tree model training application 122. Tree models where the target variable can take a discrete set of values are called classification trees where leaves of the classification tree indicate a class label and branches represent combinations of features and threshold values that result in a respective class label. Tree models where the target variable can have continuous values are called regression trees.

A decision tree is a type of predictive model defines a relationship between the input variables and the target variable. The purpose of a predictive model is to predict a target value for the target variable for a dataset, such as second dataset 624, in which the target variable value is not defined. A decision tree model type creates a decision tree by splitting input dataset 124 that is a root node of the tree into successive subsets. The splitting is based on a set of split tests based on values of a variable also referred to as a feature herein. The splitting process is repeated on each derived subset in a recursive manner that is complete when the subset at a node has the same value for the target variable, or when splitting no longer improves the prediction. An input variable is chosen and used to create a test or rule to split the data into two or more subsets. The process is repeated for each subset successively until some constraint is met. The subsets are associated with nodes where the original data is associated with the root node, and the final unpartitioned subsets are leaves or terminal nodes that are associated with values for the target variable. A node is an internal node if it is not a leaf node or the root node. The data in a leaf node determines the estimate of the value of the target variable. These estimates are applied to predict the target value for a new observation, for example, read from dataset 624 that is assigned to the leaf node.

Associated with each node is a split test based on a comparison of a variable value of a variable of the plurality of variables using a logical operation, such as <, >, ≤, ≥, ≠, =, and a threshold value. For example, a split test may be $x_3<4$, where $x_3$ indicates a value of a third variable of the observation vector x that is compared to determine if it is less than or equal to a threshold value of 4 to determine to which child node of the node the observation vector is assigned.

Figure 3A:
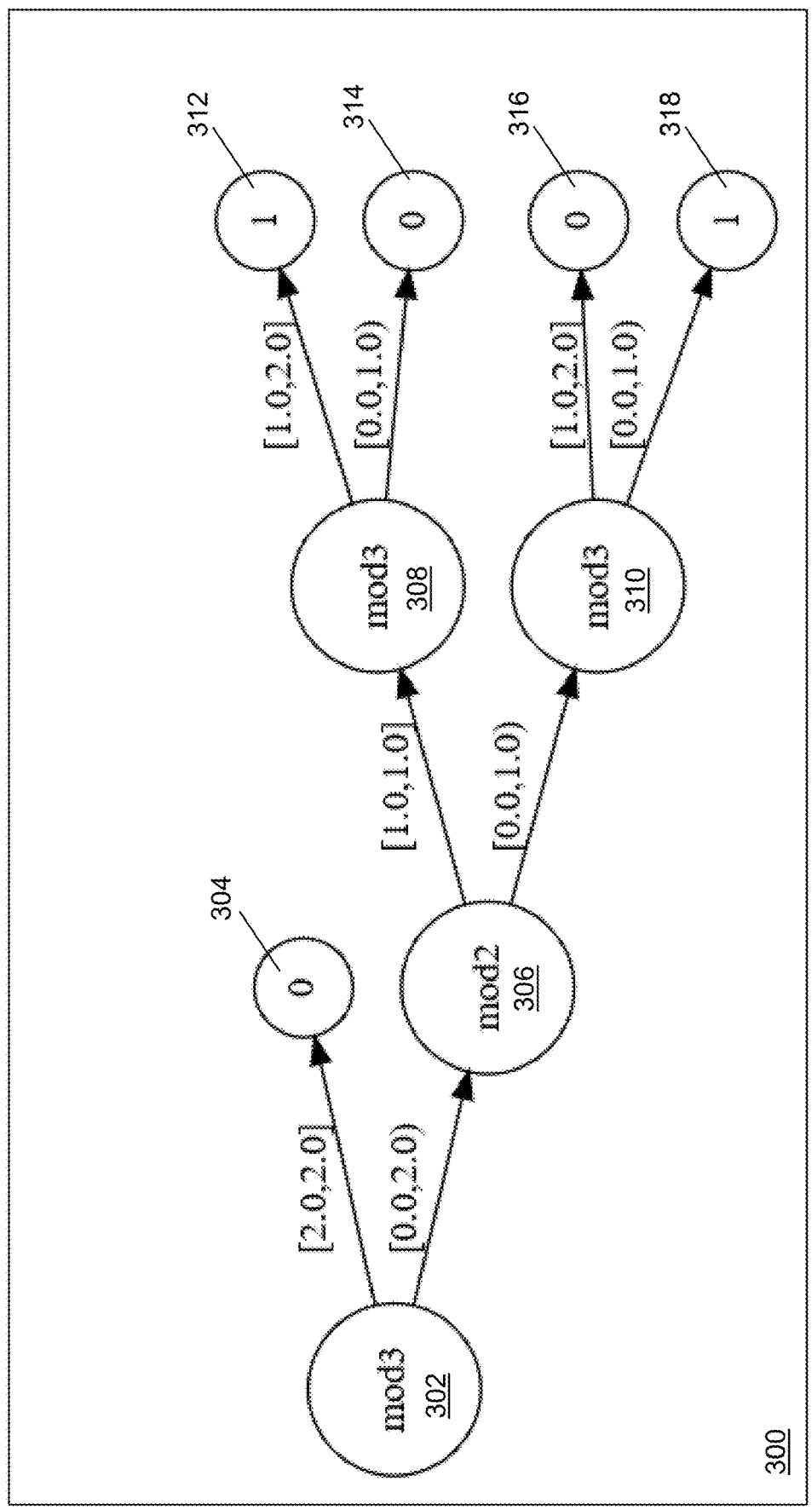
FIG. 3A shows a tree with 9 nodes, five of which are leaf nodes, in accordance with an illustrative embodiment.

For illustration, referring to FIG. 3A, a decision tree 300 is shown that includes nine nodes, five of which are leaf nodes, in accordance with an illustrative embodiment. Tree 300 includes a root node 302 from which two child nodes, a first child node 304 and a second child node 306, are created. First child node 304 does not have any child nodes that descend from it so it is a first leaf node. A third child node 308 and a fourth child node 310 are created and descend from second child node 306. A fifth child node 312 and a sixth child node 314 are created and descend from third child node 308. A seventh child node 316 and an eighth child node 318 are created and descend from fourth child node 310. No children descend from fifth child node 312, sixth child node 314, seventh child node 316, or eighth child node 318 so each is a leaf node.

Decision tree 300 predicts which mod 6 numbers are equal to 0 or 1. Input dataset 124 included a column of random integers, x[1], sampled from a uniform distribution. The target column, y, was derived from x[1] as $$y = \begin{cases} 1, & \text{if } x[1]\%6 \text{ in } \{0, 1\} \\ 0, & \text{otherwise} \end{cases}$$

The feature variables x[2]=mod 2 and x[3]=mod 3 were derived from x[1] as $$x[2]=x[1]\%2$$

$$x[3]=x[1]\%3$$

where x[1] is a value of a first input variable of each observation vector x, x[2] is a value of the second input variable of each observation vector x, x[3] is a value of a third input variable of each observation vector x, and y is a value of the target variable of each observation vector x. Variables x[2] and x[3] are both necessary and sufficient to achieve 100% accuracy because x[1]%2 and x[1]%3 together determine x[1]%6. A perfect (100% accuracy) decision tree model was trained to create decision tree 300.

For illustration, a sample of input dataset 124 is shown below in Table I:

TABLE I

| x[1] | x[2] | x[3] | y |
|------|------|------|---|
| 15 | 1 | 0 | 0 |
| 30 | 0 | 0 | 1 |
| 7 | 1 | 1 | 1 |
| 21 | 1 | 0 | 0 |
| 26 | 0 | 2 | 0 |

Root node 302 splits the observation vectors based on whether the value of x[3] is zero or not. When x[3] is zero, y=0 because x[1] is not a mod 6 number in which case the observation vector is assigned to first child node 304.

Second child node 306 splits the observation vectors based on whether the value of x[2] is zero or not. When x[2] is zero, the observation vector is assigned to third child node 308. When x[2] is not zero, the observation vector is assigned to fourth child node 310.

Third child node 308 splits the observation vectors based on whether the value of x[3] is zero or not. When x[3] is not zero, the observation vector is assigned to fifth child node 312, and y=1 because x[1] is a mod 6 number. When x[3] is zero, the observation vector is assigned to sixth child node 314, and y=0 because x[1] is not a mod 6 number.

Fourth child node 310 splits the observation vectors based on whether the value of x[3] is zero or not. When x[3] is zero, the observation vector is assigned to seventh child node 316, and y=0 because x[1] is not a mod 6 number. When x[3] is not zero, the observation vector is assigned to eighth child node 318, and y=1 because x[1] is a mod 6 number.

A forest model type consists of several decision trees that differ from each other in two ways. First, the training data selected from input dataset 124 for a tree is a sample with or without replacement from all available observations. Second, the input variables that are considered for splitting a node are randomly selected from all available input variables indicated in operation 202. Among these randomly selected variables, the forest model type chooses a single variable, which is associated the most with the target variable, when it forms a splitting rule. In other respects, trees in a forest are trained like a standard decision tree.

The gradient boosting tree model type automatically adjusts gradient boosting tree parameters to tune a gradient boosting tree model for minimum error as measured by a specified objective function. The gradient boosting tree model type consists of multiple decision trees created by fitting a set of additive trees.

For illustration, a Decision Tree node or a SPLIT procedure of SAS® Enterprise Miner™ 14.3 may be used to implement the decision tree model type. For illustration, a FOREST procedure included in SAS® Visual Data Mining and Machine Learning 8.1 or an HP Forest node or an HPFOREST procedure in SAS® Enterprise Miner™ 14.3 may be used to implement the forest model type. For illustration, a GRADBOOST procedure included in SAS® Visual Data Mining and Machine Learning 8.1 or a Gradient Boosting node or a TREEBOOST procedure in SAS® Enterprise Miner™ 14.3 may be used to implement the gradient boosting tree model type.

In an operation 208, a fifth indicator may be received that defines values for one or more of the hyperparameters to evaluate based on the selected tree model type as well as other parameters used to describe the training and validating process. As an example, the fifth indicator may be received by tree model training application 122 after selection from a user interface window or after entry by a user into a user interface window. In an alternative embodiment, the fifth indicator may not be received. For example, one or more default values may be stored, for example, in computer-readable medium 108 and used automatically. In another alternative embodiment, the value of each hyperparameter/parameter may not be selectable. Instead, fixed, predefined values may be used. Using the fifth indicator, the user may select one or more of the hyperparameters to evaluate using a lower bound value, an upper bound value, and an iteration value and/or a specific value. Using the fifth indicator, the user may identify one or more of the hyperparameters to evaluate using a list of possible values instead of a range of default values. Using the fifth indicator, the user may identify one or more of the hyperparameters to evaluate using default bounds and initial values. Illustrative hyperparameters are described below for each illustrative tree model type though a greater or a fewer number and types of hyperparameters may be defined for each tree model type in alternative embodiments.

For example, the decision tree model type hyperparameters may include a maximum number of decision tree levels (maxlevel), a number of bins to use for numeric variables during calculation of the decision tree (nbins), and a split criterion for each tree node (criterion). The decision tree model type may automatically adjust decision tree hyperparameters to tune a decision tree model for minimum error as measured by a specified objective function. For illustration, a tuneDecisionTree action selects different hyperparameter configurations to run a dtreeTrain action, optionally a dtreePrune action, and a dtreeScore action (an assess action may be run after each dtreeScore action) multiple times to train and validate a decision tree model as it searches for a model that has reduced validation error. For illustration, the tuneDecision Tree action, the dtreeTrain action, the dtreePrune action, and the dtreeScore action are included in SAS® Viya™ and SAS® CAS.

For example, the forest model type hyperparameters may include a fraction (bootstrap) of a random bootstrap sample of the training data to be used for growing each tree in the forest, where the fraction is a value between 0 and 1 with a default value of 0.6. The forest model type hyperparameters further may include a maximum depth (maxlevel) of a decision tree to be grown where a number of levels in a tree is equal to a depth value plus one. A default value for the maximum depth may be 20. The forest model type hyperparameters further may include a number of trees (ntrees) to grow, which by default may be equal to 100. The forest model type hyperparameters further may include a number of input variables (vars_to_try) to consider splitting on in a node, where the value is between one and a number of input variables with a default value equal to a square root of the number of input variables.

The forest model type may automatically adjust forest hyperparameters to tune a forest model for minimum error as measured by a specified objective function. For illustration, an "autotune" statement used with the FOREST procedure included in SAS® Visual Data Mining and Machine Learning 8.1 may be used to evaluate different hyperparameter configurations and to select the best configuration of hyperparameter values for the forest model type. A tuneForest action selects different hyperparameter configurations to run a forestTrain action and a forestScore action multiple times to train and validate the forest model as it searches for a model that has reduced validation error. For illustration, the tuneForest action, the forestTrain action, and the forestScore action are included in SAS Viya™ and SAS® CAS.

For example, the gradient boosting tree model type hyperparameters may include an L1 norm regularization parameter (lasso) that is greater than or equal to zero with a default value of zero. The gradient boosting tree model type hyperparameters further may include a learning rate (learningrate) that is between zero and one, inclusive, with a default value of 0.1. The gradient boosting tree model type hyperparameters further may include a number of trees (ntrees) to grow with a default value of 100. The gradient boosting tree model type hyperparameters further may include an L2 norm regularization parameter (ridge) that is greater than or equal to zero with a default value of zero. The gradient boosting tree model type hyperparameters further may include a fraction (samplingrate) of the training data to be used for growing each tree with a default value of 0.5. The gradient boosting tree model type hyperparameters further may include a number of input variables (vars_to_try) to consider splitting on in a node where the value is between one and a number of input variables with a default value equal to the number of input variables.

For illustration, an "autotune" statement used with the GRADBOOST procedure included in SAS® Visual Data Mining and Machine Learning 8.1 may be used to evaluate different hyperparameter configurations and to select the best configuration of hyperparameter values for the gradient boosting tree model type. A tuneGradientBoostTree action selects different hyperparameter configurations to run the gbtreeTrain and gbtreeScore actions multiple times to train and validate gradient boosting tree models as it searches for a model that has reduced validation error. For illustration, the gbtreeTrain and gbtreeScore actions are included in the decisionTree action set of SAS® Viya™ and SAS® CAS.

In an operation 210, a sixth indicator may be received that provides validation parameters that describe a validation process. For example, the sixth indicator may include a fraction value for a fraction of the training data to be used for validation or the number of folds F for cross-validation. In an alternative embodiment, the sixth indicator may not be received. For example, a default value may be stored, for example, in computer-readable medium 108 and used automatically. In another alternative embodiment, a fixed, predefined value may be used for the fraction value unless the number of folds F is defined by the user. In cross validation, each model evaluation requires F−1 number of training executions and scoring executions with different training subsets as discussed previously.

In an operation 212, a seventh indicator of a feature importance method may be received. For example, the seventh indicator indicates a name of a feature importance method. The seventh indicator may be received by tree model training application 122 after selection from a user interface window or after entry by a user into a user interface window. As an example, a feature importance method may be selected from "Leaf based" and "Betweenness". The feature importance method may be labeled or selected in a variety of different manners by the user as understood by a person of skill in the art. In an alternative embodiment, the feature importance method may not be selectable, and a single feature importance method is implemented in tree model training application 122. The feature importance method indicates a method computing a feature importance value for each variable of the plurality of variables indicated in operation 202.

In an operation 214, a determination is made concerning whether the feature importance method indicated in operation 212 is the leaf based method. When the feature importance method is the leaf based method, processing continues in an operation 216. When the feature importance method is not the leaf based method, processing continues in an operation 218.

In operation 216, an eighth indicator of an impurity function may be received. For example, the eighth indicator indicates a name of an impurity function.

In a classification problem, impurity metrics describe how well a population is separated into classes of the target variable. High impurity indicates that there is an even mix of multiple classes, while low impurity indicates homogenous existence of a single class. The goal of tree based models is to separate the population into nodes with as little impurity as possible. The eighth indicator may be received by tree model training application 122 after selection from a user interface window or after entry by a user into a user interface window. As an example, an impurity function may be selected from "Gini", "Entropy", "Variance", "Chi-square", "F-statistic", etc. The impurity function may be labeled or selected in a variety of different manners by the user as understood by a person of skill in the art. In an alternative embodiment, the impurity function may not be selectable, and a single impurity function is implemented in tree model training application 122. For illustration, the Gini impurity function computation can be expressed as $I_G(P)=1-\Sigma_k P_k^2$, where P is the observations included in input dataset 124, k is an index to a target class label value or a target class label value, and $P_k$ is a percentage of P that has the target variable value of k. For illustration, the entropy impurity function computation can be expressed as $I_E(P)=-\Sigma_k P_k \log_2 P_k$. For illustration, the variance impurity function computation can be expressed as $$I_V(P) = -\sum_k \left( \frac{1}{|P_k|^2} \sum_{i \in P} (y_i - P_k)^2 \right),$$

where $y_i$ represents a target variable value in a regression problem. For illustration, the chi-square impurity function computation can be expressed as $$I_X(P) = -\sum_k \sum_{i \in P} \sqrt{\frac{(y_i - P_k)^2}{P_k}}.$$

For illustration, the F-statistic impurity function computation can be expressed as $$I_F(P) = -\sum_k \frac{(P^* - P_k)^2}{|P|P_k},$$

where P* is a mean target value of P.

In operation 218, a ninth indicator of a relevance threshold value $T_r$ may be received. As an example, the ninth indicator may be received by tree model training application 122 after selection from a user interface window or after entry by a user into a user interface window. In an alternative embodiment, the ninth indicator may not be received. For example, a default value may be stored, for example, in computer-readable medium 108 and used automatically. In another alternative embodiment, the value of the relevance threshold value $T_r$ may not be selectable. Instead, a fixed, predefined value may be used. For illustration, a default value of the relevance threshold value $T_r$ may be $T_r=0.05$ though other values may be used.

In an operation 220, input dataset 124 is partitioned into a training data subset and a validation data subset. For example, the training data subset and the validation data subset 436 may be split into two partitions based on the fraction value indicated in operation 210. For illustration, if fraction value is 0.3 or 30%, 30% of the observation vectors in input dataset 124 are extracted to create the validation data subset and the remaining 70% of the observation form the training data subset.

As another option, input dataset 124 is partitioned into a plurality of training data subsets and a validation data subset based on a number of folds F defined for cross-validation and indicated in operation 210. F−1 partitions form F−1 training dataset subsets with the remaining partition forming the validation data subset. Using cross validation, each tree model evaluation requires F−1 training and scoring executions with different training data subsets. For example, if the number of folds value F=4, input dataset 124 is partitioned into four subsets A, B, C, D. For a first execution loop, a first partition (e.g., A) is selected to form a first training data subset with a fourth partition D selected to form the validation data subset. For a second execution loop, a second partition (e.g., B) is selected to form a second training data subset with the fourth partition D again forming the validation data subset. For a third execution loop, a third partition (e.g., C) is selected to form a third training data subset with the fourth partition D again forming the validation data subset. The data further may be partitioned based on the tree model type indicated in operation 208.

In an operation 222, a root node is defined for a new decision tree to be trained where the root node includes all of the observations included in a selected data distribution.

In an operation 224, a split node is defined that identifies a split test that may include a variable of the plurality of variables indicated in operation 202, a comparison operator such as '<', '>', '=', '≤', '≥', '≠', and a threshold value used to define a further split of the selected data distribution into subsets. For example, a split node may be defined as $x_3 \leq 8$ or $x_4$='male', etc., where the variable is $x_3$ or $x_4$, respectively, the comparison operator is ≤ or =, respectively, and the threshold value is 8 or male, respectively. Values that satisfy the split test of the split node may be partitioned into a first split, and values that do not satisfy the split test of the split node may be partitioned into a second split. The identification of the split node may be performed in various manners based on the tree model type indicated in operation 206 and the tree model type parameters indicated in operation 208 as understood be a person of skill in the art.

In an operation 226, a node mask is defined for the split node that defines whether each observation in input dataset 124 is in the first split or the second split. For example, the node mask may include a bit mask value of '1' when the observations are included in the first split, and a bit mask value of 'O' when the observations are included in the second split. Associated with the node mask is an indicator of the split node, an indicator of the parent node of the split node, an indicator of the variable of the split node, an indicator of the threshold value of the split node, and optionally, an indicator of the comparison operator of the split node. In an illustrative embodiment, the comparison operator of the split node may default to ≤. The node mask has a dimension of N, the number of the observation vectors included in input dataset 124. For example, on a first iteration, a parent node of the split node is the root node. When each split node is created, a consecutive counter may be used to assign each split node a unique identifier.

Illustrative first pseudocode for defining the node mask for the split node k is:
  p←Parent(k)
  f←Feature(p)
  T←Threshold(p)
  if k=LeftChild(p) then
    b←1
  else
    b←0
  end if
  for all n in [0, N−1] do
    if x[n,f]≤T then
      $M_k$ [n]←b
    else
      $M_k$ [n]←−b
    end if
  end for In the illustrative pseudocode, the node mask $M_k$ defined for the split node k is an array of binary values such that a zero in $M_k$[n], an $n^{th}$ element of the node mask $M_k$, means that the observation is excluded from the population, and a one in $M_k$[n] means that the observation is included in the population. Each node mask $M_k$ represents a logic defined in the split of the immediate parent node of k. Each node mask $M_k$ may be defined using the first pseudocode independently with processing distributed across a plurality of threads of tree model training device 100.

In an operation 228, a determination is made concerning whether there is another split node to define or training of the decision tree is complete. When there is another split node to define, processing continues in operation 224. When there is not another split node to define, processing continues in an operation 230.

In operation 230, when there are a plurality of decision trees based on the tree model type, a determination is made concerning whether there is another tree to define or training of the tree model is complete. When there is another tree to define, processing continues in operation 220. When there is not another tree to define, processing continues in an operation 232 shown referring to FIG. 2B.

In operation 232, a determination is made concerning whether the feature importance method is the leaf based method. When the feature importance method is the leaf based method, processing continues in an operation 234. When the feature importance method is not the leaf based method, processing continues in an operation 270 shown referring to FIG. 2C.

In operation 234, a next tree of the trained model is selected. For example, on a first iteration of operation 234, a first tree is selected; on a second iteration of operation 234, a second tree is selected; etc.

In an operation 236, a next node i of the selected next tree that is not a leaf node is selected in order using the unique identifier i assigned to the selected next node. The root node is skipped.

In an operation 238, a number of observations $|P_t(i)|$ included in or associated with the selected next node i is computed using the node mask defined for the selected next node. For example, a number of ones in the node mask defined for the selected next node i is computed.

In an operation 240, a population ratio value R is computed as $R=|P_t(i)|/N$.

In an operation 242, a next leaf node j that descends from the selected next node i is selected. For example, a list of descendent leaf nodes may be identified by recursively descending from each child node of the selected next node i until each leaf node is identified and added to the list before selecting the next leaf node j.

In an operation 244, a population P(j) of observations included in or associated with the selected next leaf node j is identified, for example, using the node mask defined for the selected next leaf node j. For example, observations associated with a one in the node mask defined for the selected next leaf node j are identified. Illustrative second pseudocode for defining the node mask for the split node k is:
  for all n in [0, N−1] do
    P(j) [n]−$M_j$[n]
  end for
  k←Parent(j)
  while k is not root node do
    for all n in [0, N−1] do
      P(j) [n]←P(j) [n] ∧ $M_k$ [n]
    end for
    k←Parent(k)
  end while where ∧ indicates a binary AND operator. Node population P(j) is a subset of an entire population of the plurality of observation vectors P. Node population P(j) represents the observations that fall into the selected next leaf node j based on the tree logic encoded in the upstream nodes, which is the nodes between the root and the selected next leaf node j.

In an operation 246, a first impurity value is computed for the selected next leaf node j using P(j) and the impurity function indicated in operation 216. For example, the Gini impurity function computation can be computed as $I(P(j))=1-\Sigma_k P(j)_k^2$, the entropy impurity function computation can be expressed as $I_E(P(j))=-\Sigma_k P(j)_k \log_2 P(j)_k$, the variance impurity function computation can be expressed as $$I_V(P(j)) = -\sum_k \left( \frac{1}{|P(J)_k|^2} \sum_{i \in P} (y_i - P(j)_k)^2 \right),$$

the chi-square impurity function computation can be expressed as $$I_X(P(j)) = -\sum_k \sum_{i \in P(j)} \sqrt{\frac{(y_i - P(j)_k)^2}{P(j)_k}},$$

and the F-statistic impurity function computation can be expressed as $$I_F(P(j)) = -\sum_k \frac{(P(j)^* - P(j)_k)^2}{|P(j)|P(j)_k}.$$

Though a leaf node is associated with a single predicted class label, there are multiple true class labels in the leaf node's population unless all of the predictions for that leaf node are correct. Impurity is a measure of how close the node's population is to being a single actual class k.

In an operation 248, a modified population $P_t(j)$ of observations included in the selected next leaf node j is identified, for example, using the node mask defined for the selected next leaf node j and assigning the population $P_t$ to each of the child nodes of the selected next node i and recomputing the population of observations included in the selected next leaf node j based on the remaining split nodes between the selected next node i and the selected next leaf node j. Though all of the observations are sent to both child nodes, the impurity value $I_m$ is divided by two, 0.5 $I_m$ below, to simulate an expected value of a 50-50 coin toss. Illustrative third pseudocode for defining the modified population $P_i(j)$ is:

```
for all n in [0,N − 1] do
    P_i(j)[n] ← M_j[n]
end for
k ← Parent(j)
while k is not root node do
    if k ≠ i then
        for all n in [0, N − 1] do
            P_i(j)[n] ← P_i(j)[n] ∧ M_k[n]
        end for
    end if
    k ← Parent(k)
end while
```

Modified population $P_i(j)$ represents a node population of the selected next leaf node j subject to removal of the logic represented by the split at the selected next node i. Because $P_i(j)$ only depends on upstream split logic, $P_i(j)$ need only be computed for i,j pairs such that the selected next leaf node j is a descendant of the selected next node i.

Because the iterations of the second pseudocode and the third pseudocode consist of independent iterations, P(j) and $P_i(j)$ can be computed using vectorization when supported by the compiler and hardware of tree model training device 100; otherwise, the operations that perform the second pseudocode and the third pseudocode can be split among a plurality of threads of tree model training device 100. In addition, or in the alternative, the operations to compute P(j) and $P_i(j)$ that are repeated for combinations of i and j can be independently computed in separate threads of tree model training device 100, where each thread handles one or more i,j combinations.

In an operation 250, a second impurity value is computed for the selected next leaf node j using $P_i(j)$ and the impurity function indicated in operation 216. For example, the Gini impurity function computation can be computed as $I(P_i(j))=1-\Sigma_k P_i(j)_k^2$, and the entropy impurity function computation can be expressed as $I(P_i(j))=-\Sigma_k P_i(j) \log_2 P_i(j)$.

In an operation 252, a gain contribution value 0.5 R(I($P_i$(j))−I(P(j))) is added to a node gain value of the selected next node i. For example, the node gain value for the selected next node i may be initialized to zero, for example using $G_n(i)=0$, in operation 236, and updated each iteration of 252 using $G_n(i)=G_n(i)+0.5$ R(I($P_i$(j))−I(P(j))), where $G_n(i)$ is the node gain value of the selected next node i.

In an operation 254, a determination is made concerning whether the selected next node i has another leaf node that descends from it. When the selected next node i has another leaf node, processing continues in operation 242. When the selected next node i does not have another leaf node, processing continues in an operation 256.

Operations 242 through 252 to compute each $G_n(i)$ are independent so that $G_n(i)$ may be computed for each i in parallel across the plurality of threads of tree model training device 100. Since the cost to compute $G_n(i)$ is proportional to a number of leaf nodes $L_i$ descending from i, the computations may be balanced among the plurality of threads of tree model training device 100 based on a roughly equal sum value $\Sigma_{i \in S_t} L_i$ for the set $S_t$ of nodes assigned to each thread t. For a balanced binary tree, a simple way to achieve load balancing across the plurality of threads of tree model training device 100 is to assign all nodes of depth d to thread dmodt.

In operation 256, the node gain value $G_n(i)$ computed for the selected next node i is added to a variable gain value $G_v$ computed for the variable of the selected next node i. For example, the variable gain value $G_v$ may be initialized to zero, for example using $G_v=0$, before operation 234, and updated each iteration of operation 256 using $G_v=G_v+G_n(i)$, where v indicates the variable of the plurality of variables used by the split test associated with the selected next node i. For example, v may be an index to the variable used to define each observation vector, where $v=1, \ldots, N_v$.

In an operation 258, a determination is made concerning whether there is another node in the selected next tree. When there is another node in the selected next tree, processing continues in operation 236. When there is not another node in the selected next tree, processing continues in an operation 260.

In operation 260, a determination is made concerning whether there is another tree in the trained model tree. When there is another tree, processing continues in operation 234. When there is not another tree, processing continues in an operation 262. Operations 236 through 258 may be performed in parallel for each decision tree of the trained tree model using a plurality of threads of tree model training device 100 and/or a plurality of computing devices of distributed computing system 130.

In operation 262, when pruning is selected by the user, any variable used as a split node for which $G_v<T_r$, $v= 1, \ldots, N_v$ may be removed from the trained tree model as not being a relevant variable in the trained model.

In an operation 264, the optionally pruned, trained tree model may be output to tree model description 126. The gain value $G_v$, $v=1, \ldots, N_v$ computed for each variable of the plurality of variables indicated in operation 202 may be output to variable relevance data 128. When pruning is performed, any removed variables may be output as well.

Referring to FIG. 2C, in operation 270, a next tree of the trained model is selected. For example, on a first iteration of operation 270, a first tree is selected; on a second iteration of operation 270, a second tree is selected; etc.

In an operation 272, a next node i of the selected next tree is selected in order using the unique identifier i assigned to the selected next node. The root node is skipped.

In an operation 274, a node t of the selected next tree is selected where t≠i.

In an operation 276, a node s of the selected next tree is selected where s≠i and s<t.

In an operation 278, a number of shortest paths $\sigma_{st}$ from node s to node t is determined. For illustration, a betweenness centrality algorithm described in SAS® Visual Data Mining and Machine Learning 8.5 The NETWORK Procedure published Aug. 18, 2020 by SAS Institute Inc. Cary, N.C., USA on pages 102-105 may be used to determine the number of shortest paths $\sigma_{st}$ from node s to node t.

In an operation 280, a number of shortest paths $\sigma_{st}(i)$ from node s to node t that includes the selected next node i is determined. For illustration, the betweenness centrality algorithm described in SAS® Visual Data Mining and Machine Learning 8.5 The NETWORK Procedure may be used to determine the number of shortest paths $\sigma_{st}(i)$ from node s to node t that includes the selected next node i.

In an operation 282, a gain contribution $\sigma_{st}(i)/\sigma_{st}$ is added to a node gain value $G_n(i)$ of the selected next node i. For example, the node gain value for the selected next node i may be initialized to zero, for example using $G_n(i)=0$, in operation 272, and updated each iteration of 282 using $G_n(i)=G_n(i)+\sigma_{st}(i)/\sigma_{st}$.

In an operation 254, a determination is made concerning whether there is another node s in the selected next tree where s≠i and s<t. When there is another node s, processing continues in operation 276. When there is not another node s, processing continues in an operation 286.

In operation 286, a determination is made concerning whether there is another node t in the selected next tree where t≠i. When there is another node t, processing continues in operation 274. When there is not another node t, processing continues in an operation 288.

In operation 288, the node gain value $G_n(i)$ computed for the selected next node i is added to a variable gain value $G_v$ computed for the variable of the selected next node i. For example, the variable gain value $G_v$ may be initialized to zero, for example using $G_v=0$, before operation 270, and updated each iteration of operation 288 using $G_v=G_v+G_n(i)$, where v indicates the variable of the plurality of variables used by the split test associated with the selected next node i. For example, v may be an index to the variable used to define each observation vector, where $v=1, \ldots, N_v$.

In an operation 290, a determination is made concerning whether there is another node in the selected next tree. When there is another node in the selected next tree, processing continues in operation 272. When there is not another node in the selected next tree, processing continues in an operation 292.

In operation 292, a determination is made concerning whether there is another tree in the trained model tree. When there is another tree, processing continues in operation 270. When there is not another tree, processing continues in an operation 294.

In operation 294, when pruning is selected by the user, any variable used as a split node for which $G_v<T_r$, $v=1, \ldots, N_v$ may be removed from the trained tree model as not being a relevant variable in the trained model.

In an operation 296, the optionally pruned, trained tree model may be output to tree model description 126. The gain value $G_v$, $v=1, \ldots, N_v$ computed for each variable of the plurality of variables indicated in operation 202 may be output to variable relevance data 128. When pruning is performed, any removed variables may be output as well.

Figure 3B:
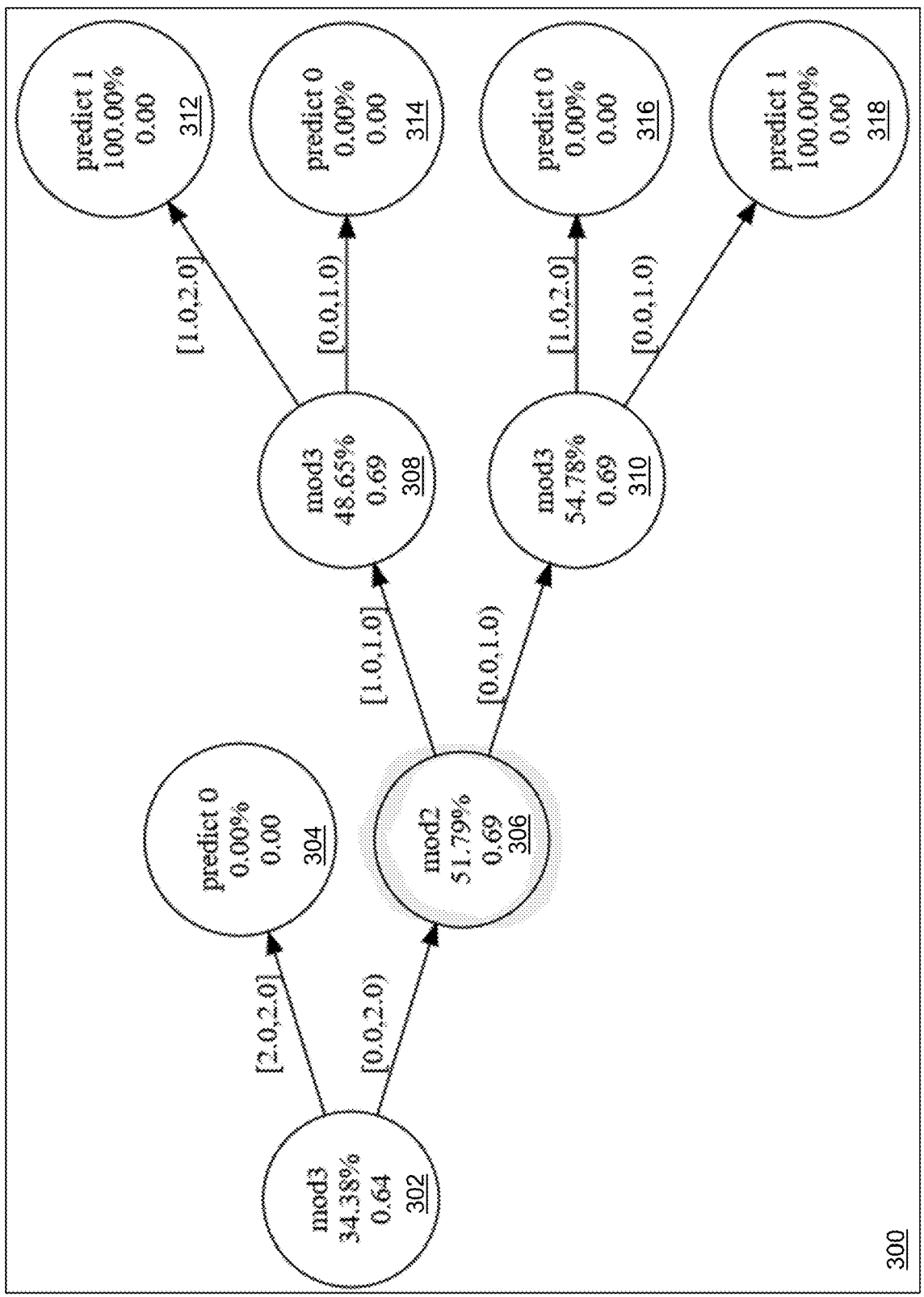
FIG. 3B shows a percentage of population at each node having label equal to one, and a Gini impurity computation for each node of the tree of FIG. 3A computed using an existing split-based method in accordance with an illustrative embodiment.

Referring to FIG. 3B, a percentage of population and a Gini impurity computed using an existing split-based method are shown at each node of decision tree 300 in accordance with an illustrative embodiment. For example, root node 302 shows a percentage of population value of 34.38% and a Gini impurity value computed using the existing split-based method of 0.64. Table II below shows the Gini split based importance that results for each variable x[2]=mod 2 and x[3]=mod 3:

TABLE II

| Variable | Relative Gini Importance |
|---|---|
| x[2] = mod2 | 1.0 |
| x[3] = mod3 | 0.0028 |

Table III below shows the Entropy split based importance also known as the information gain that results for each variable x[2]=mod 2 and x[3]=mod 3:

TABLE III

| Variable | Relative Entropy Importance |
|---|---|
| x[2] = mod2 | 1.0 |
| x[3] = mod3 | 0.0012 |

When using the existing split-based method, the feature variable x[2]=mod 2 was erroneously assigned a near-zero relative importance because, for this problem, neither x[2]=mod 2 nor x[3]=mod 3 can correctly distinguish the target variable on their own. The feature variables x[2] and x[3] must interact. However, split based methods do not capture this interaction. Instead, all of the credit for distinguishing the class or value of the target variable was assigned to downstream nodes that artificially inflates the importance score of x[3].

Figure 3C:
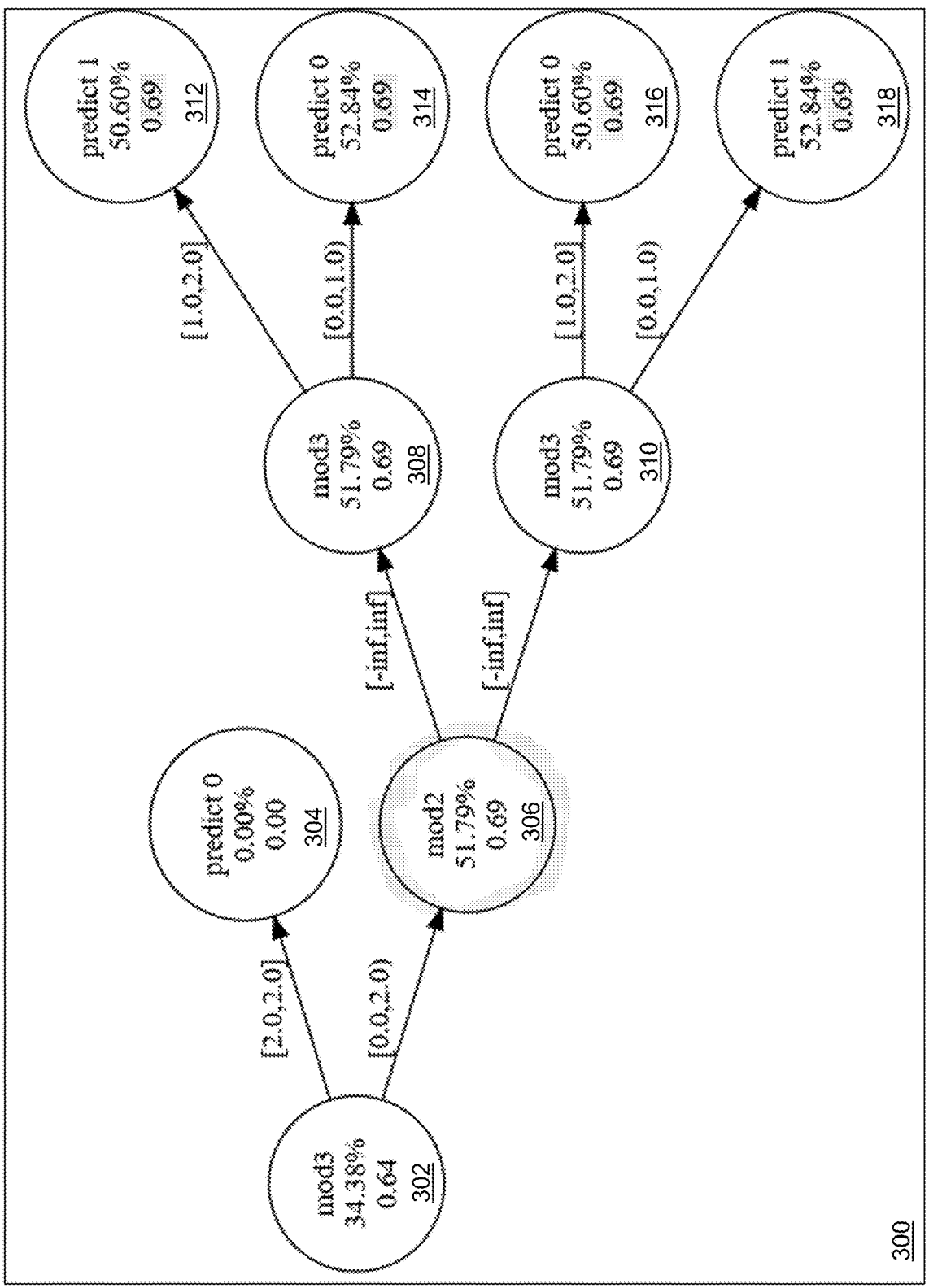
FIG. 3C shows a percentage of population at each node having label equal to one, and an impurity computation for each node of a modified tree that is the tree form shown in FIG. 3A computed using the tree model training application of the tree model training device of FIG. 1 in accordance with an illustrative embodiment.

Referring to FIG. 3C, a percentage of population and an impurity computed using operations 234 through 264 of tree model training application 122 are shown at each node of decision tree 300 in accordance with an illustrative embodiment. The relevance threshold value $T_r$ was defined as $T_r=0.05$. Table IV below shows the importance that results for each variable x[2]=mod 2 and x[3]=mod 3 using operations 234 through 264 of tree model training application 122 with a Gini impurity computation:

TABLE IV

| Variable | Relative Gini Importance |
|---|---|
| x[2] = mod2 | 1.0 |
| x[3] = mod3 | 0.53 |

Table V below shows the importance that results for each variable x[2]=mod 2 and x[3]=mod 3 using operations 234 through 264 of tree model training application 122 with an Entropy impurity computation, and the relevance threshold value $T_r$ was defined as $T_r=0.05$:

TABLE V

| Variable | Relative Entropy Importance |
|---|---|
| x[2] = mod2 | 1.0 |
| x[3] = mod3 | 0.52 |

Table VI below shows the results for each variable x[2]=mod 2 and x[3]=mod 3 using operations 270 through 296 of tree model training application 122:

TABLE VI

| Variable | Operations 270 through 296 |
|---|---|
| x[2] = mod2 | 1.0 |
| x[3] = mod3 | 0.64 |

When using the existing split-based method to determine anode contribution of second child node 306, the result was nearly zero because the split does not result in a reduction of impurity of the child node. When using the leaf based approach of operations 234 through 264 to determine a node contribution of second child node 306, the result is instead based on an increase in leaf impurity when considering the modified tree. Based on the predefined threshold value of 0.05, neither variable is rejected when using leaf-based Gini or leaf-based entropy importance. Conversely, when using the split-based Gini or split-based entropy importance values, the variable mod 3 is rejected because the calculated importance is below 0.05.

Referring to FIG. 4, a descriptive table 400 of synthetic datasets used to show the effectiveness of tree model training application 126 is shown in accordance with an illustrative embodiment. Experiments were run with 18 synthetic datasets listed in a first column 402 of descriptive table 400. The data was randomly generated with the make_classification ( ) data generator of scikit-learn. In addition to the informative (information-bearing) and garbage (non-information bearing) variables produced by make_classification( ), feature interactions were simulated by manufacturing features in one of two ways:

additive interaction: split each informative feature, I, into two components A and B such that A+B=I, according to the formula $$\begin{Bmatrix} A \\ B \end{Bmatrix} = \begin{Bmatrix} I+R \\ I-R \end{Bmatrix},$$

where R is a uniform random variable, and
categorical interaction: for each informative feature, I, introduce a random binary feature A, and let $$B = \begin{cases} -I, & \text{when } A = 0 \\ I, & \text{when } A = 1 \end{cases}.$$

Features A and B were included in input dataset 124 and feature I was discarded. A second column 404 of descriptive table 400 indicates a number of classes, a third column 406 of descriptive table 400 indicates a number of informative variables, a fourth column 408 of descriptive table 400 indicates a number of garbage variables, a fifth column 410 of descriptive table 400 indicates a number of interaction variables, a sixth column 412 of descriptive table 400 indicates an interaction type used to create the interaction variables included in the respective dataset. A seventh column 414 of descriptive table 400 indicates a number of most relevant variables selected, and an eighth column 416 of descriptive table 400 indicates a number of decision trees included in the trained forest model type for each execution. A ninth column 418 of descriptive table 400 indicates the relevance threshold value $T_r$. Rather than a single constant threshold, the relevance threshold value $T_r$ was adjusted for each case so that the number of features in column 414 of descriptive table 400 have importance values above the threshold. The Gini impurity function was selected.

Referring to FIG. 5, a results table 500 for each dataset of the synthetic datasets included in descriptive table 400 is shown in accordance with an illustrative embodiment. A first column 502 of results table 500 indicates the synthetic dataset case listed in descriptive table 400. A second column 504 of results table 500 indicates a classification accuracy computed using operations 234 through 264 of tree model training application 122 (indicated as "leaf-based") to select the number of most relevant variables indicated in seventh column 414 of descriptive table 400 to train the forest model type having the number of decision trees indicated in eighth column 416 of descriptive table 400. A third column 506 of results table 500 indicates a classification accuracy computed using the existing split based method to select the number of most relevant variables indicated in seventh column 414 of descriptive table 400 to train the forest model type having the number of decision trees indicated in eighth column 416 of descriptive table 400. A fourth column 508 of results table 500 indicates a classification accuracy computed using all of the variables to train the forest model type having the number of decision trees indicated in eighth column 416 of descriptive table 400. A fifth column 510 of results table 500 indicates a number of garbage variables included in the most relevant variables identified using operations 234 through 264 of tree model training application 122. A sixth column 512 of results table 500 indicates a number of garbage variables included in the most relevant variables identified using the existing split based method. A seventh column 514 of results table 500 indicates a number of garbage variables included in all of the variables.

In general, tree model training application 122 provides improved training/scoring runtime and easier interpretation of the model because they are simpler. Simpler models are less likely to overfit and generalize better to data with different distributions than input dataset 124. By limiting to the top N most important features, the benefit is not that the simpler models necessarily result in improved accuracy relative to those trained with all of the features though in cases 6, 8, and 12 they do. Rather, the simpler models are close in accuracy if the N features are really the most important ones meaning they convey compactly most of the information from input dataset 124. Also, for the synthetic datasets, it is known that certain "garbage" features are non-informative. A better feature selection technique rejects more of the garbage features and keeps more of the "informative" and "interaction" features. While the leaf based approach of operations 234 through 264 does not outperform in every case, it does produce different feature importance rankings that are not inferior because they have similar or better accuracy and garbage-feature-rejection overall. The leaf based approach of operations 234 through 264 adds value because the user can compute the importance values in addition to the split based importance values. In practice, a user could select, for each model trained, either split based or leaf based depending on which method achieves better accuracy during cross validation, or take an ensemble average of both leaf based and split based importance values Prototype implementations to determine feature importance using operations 234 through 264 of tree model training application 122 with the Gini impurity measure, operations 270 through 296 of tree model training application 122, the existing split based method with the Gini impurity measure, and an existing resampling method were implemented using the Python programming language. Each method was executed using the synthetic dataset indicated as case 1. The trained forest model defined 50 moderately sized tree models with an average size of 143 nodes. The computation times are shown in Table VII below:

TABLE VI

| Method | Computation time (seconds) |
| --- | --- |
| Split based | 0.8 |
| Resampling | 50 |
| Operations 234 through 264 | 167 |
| Operations 270 through 296 | 0.3 |

Operations 234 through 264 can be parallelized by tree and by node. Operations 234 through 264 used 2.6 seconds per tree and 0.02 seconds per node. Thus, when parallelized at the per node computation level, the computation time can be significantly faster than the existing split based method.

The existing resampling method can be parallelized by tree and by feature. The existing resampling method used 0.8 seconds per tree and 0.01 seconds per feature.

Figure 6:
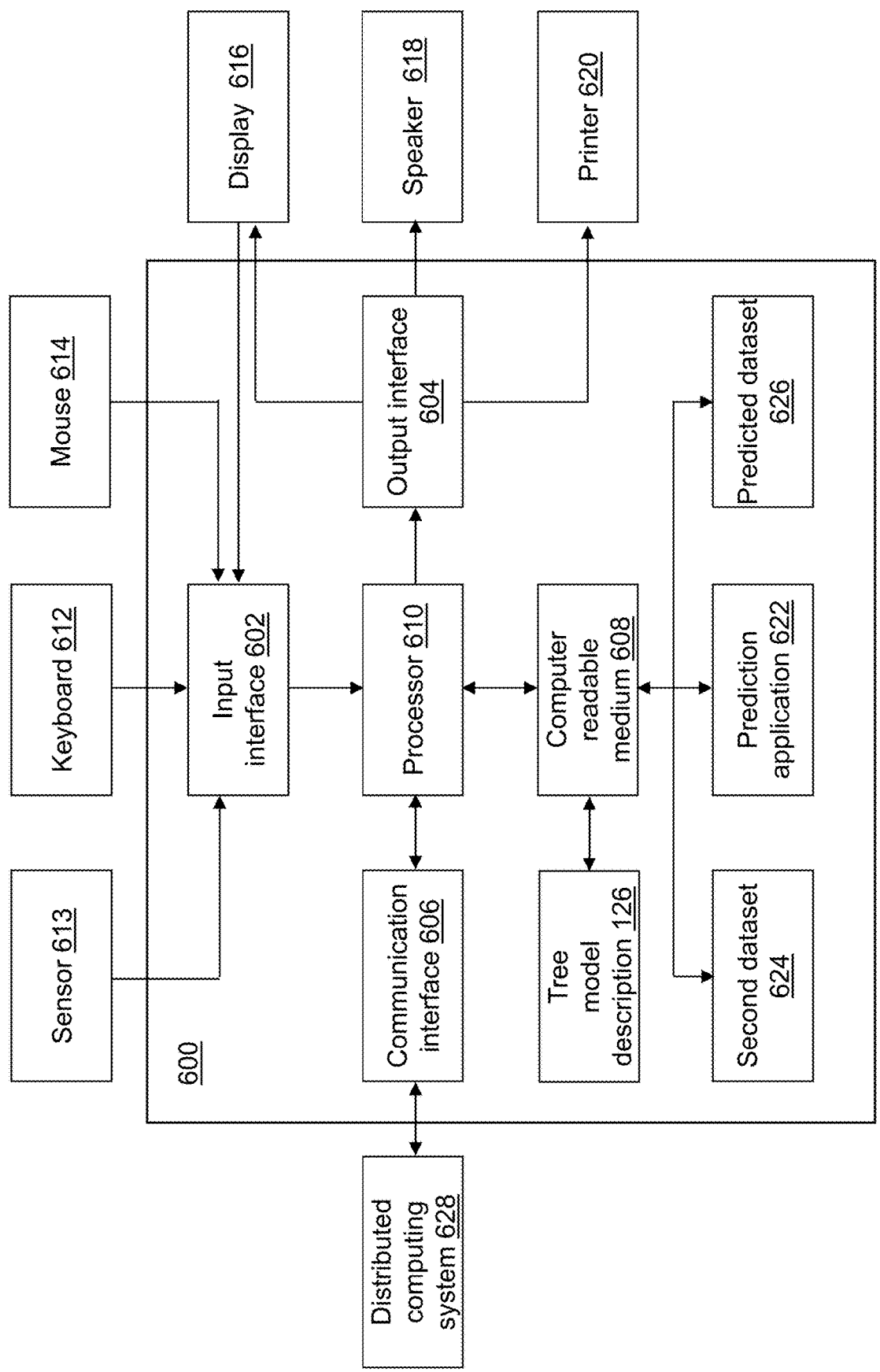
FIG. 6 depicts a block diagram of a prediction device in accordance with an illustrative embodiment.

Referring to FIG. 6, a block diagram of a prediction device 600 is shown in accordance with an illustrative embodiment. Prediction device 600 may include a second input interface 602, a second output interface 604, a second communication interface 606, a second non-transitory computer-readable medium 608, a second processor 610, a prediction application 622, tree model description 126, second dataset 624, and predicted dataset 626. Fewer, different, and/or additional components may be incorporated into prediction device 600. Prediction device 600 and tree model training device 100 may be the same or different devices.

Second input interface 602 provides the same or similar functionality as that described with reference to input interface 102 of tree model training device 100 though referring to prediction device 600. Second output interface 604 provides the same or similar functionality as that described with reference to output interface 104 of tree model training device 100 though referring to prediction device 600. Second communication interface 606 provides the same or similar functionality as that described with reference to communication interface 106 of tree model training device 100 though referring to prediction device 600. Data and messages may be transferred between prediction device 600 and a distributed computing system 628 using second communication interface 606. Second computer-readable medium 608 provides the same or similar functionality as that described with reference to computer-readable medium 108 of tree model training device 100 though referring to prediction device 600. Second processor 610 provides the same or similar functionality as that described with reference to processor 110 of tree model training device 100 though referring to prediction device 600.

Prediction application 622 performs operations associated with classifying or predicting a target variable value for each observation vector included in second dataset 624. The target variable value may be stored in predicted dataset 626 to support various data analysis functions as well as provide alert/messaging related to the classified/predicted data. Dependent on the type of data stored in input dataset 124 and second dataset 624, prediction application 622 may identify anomalies as part of process control, for example, of a manufacturing process, for machine condition monitoring, for image classification, for intrusion detection, for fraud detection, etc. Some or all of the operations described herein may be embodied in prediction application 622. The operations may be implemented using hardware, firmware, software, or any combination of these methods.

Referring to the example embodiment of FIG. 6, prediction application 622 is implemented in software (comprised of computer-readable and/or computer-executable instructions) stored in second computer-readable medium 608 and accessible by second processor 610 for execution of the instructions that embody the operations of prediction application 622. Prediction application 622 may be written using one or more programming languages, assembly languages, scripting languages, etc. Prediction application 622 may be integrated with other analytic tools. As an example, prediction application 622 may be part of an integrated data analytics software application and/or software architecture such as that offered by SAS Institute Inc. of Cary, N.C., USA. For example, prediction application 622 may be part of SAS® Enterprise Miner™ developed and provided by SAS Institute Inc. of Cary, N.C., USA. Merely for further illustration, prediction application 622 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Analytics, SAS® Viya™, SAS In-Memory Statistics for Hadoop®, all of which are developed and provided by SAS Institute Inc. of Cary, N.C., USA. One or more operations of prediction application 622 further may be performed by an ESPE. Prediction application 622 and tree model training application 122 may be the same or different applications that are integrated in various manners to execute a tree model using input dataset 124 that may be distributed and/or second dataset 624.

Prediction application 622 may be implemented as a Web application. Prediction application 622 may be integrated with other system processing tools to automatically process data generated as part of operation of an enterprise, to classify data in the processed data, and/or to provide a warning or alert associated with the data classification using second input interface 602, second output interface 604, and/or second communication interface 606 so that appropriate action can be initiated in response. For example, a warning or an alert may be presented using a second display 616, a second speaker 618, a second printer 620, etc. or sent to one or more computer-readable media, display, speaker, printer, etc. of distributed computing system 628.

Input dataset 124 and second dataset 624 may be generated, stored, and accessed using the same or different mechanisms. Similar to input dataset 124, second dataset 624 may include a plurality of rows and a plurality of columns with the plurality of rows referred to as observations or records, and the columns referred to as variables that are associated with an observation. Second dataset 624 may be transposed.

Similar to input dataset 124, second dataset 624 may be stored on second computer-readable medium 608 or on one or more computer-readable media of distributed computing system 628 and accessed by prediction device 600 using second communication interface 606. Data stored in second dataset 624 may be a sensor measurement or a data communication value, for example, from a sensor 613, may be generated or captured in response to occurrence of an event or a transaction, generated by a device such as in response to an interaction by a user with the device, for example, from a second keyboard 612 or a second mouse 614, etc. The data stored in second dataset 624 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 624 may be captured at different time points periodically, intermittently, when an event occurs, etc. One or more columns may include a time value. Similar to input dataset 124, data stored in second dataset 624 may be generated as part of the IoT, and some or all data may be pre- or post-processed by an ESPE.

Similar to input dataset 124, second dataset 624 may be stored in various compressed formats such as a coordinate format, a compressed sparse column format, a compressed sparse row format, etc. Second dataset 624 further may be stored using various structures as known to those skilled in the art including a file system, a relational database, a system of tables, a structured query language database, etc. on prediction device 600 and/or on distributed computing system 628. Prediction device 600 and/or distributed computing system 628 may coordinate access to second dataset 624 that is distributed across a plurality of computing devices that make up distributed computing system 628. For example, second dataset 624 may be stored in a cube distributed across a grid of computers as understood by a person of skill in the art. As another example, second dataset 624 may be stored in a multi-node Hadoop® cluster. As another example, second dataset 624 may be stored in a cloud of computers and accessed using cloud computing technologies, as understood by a person of skill in the art. The SAS LASR™ Analytic Server and/or SAS® Viya™ may be used as an analytic platform to enable multiple users to concurrently access data stored in second dataset 624.

Figure 7:
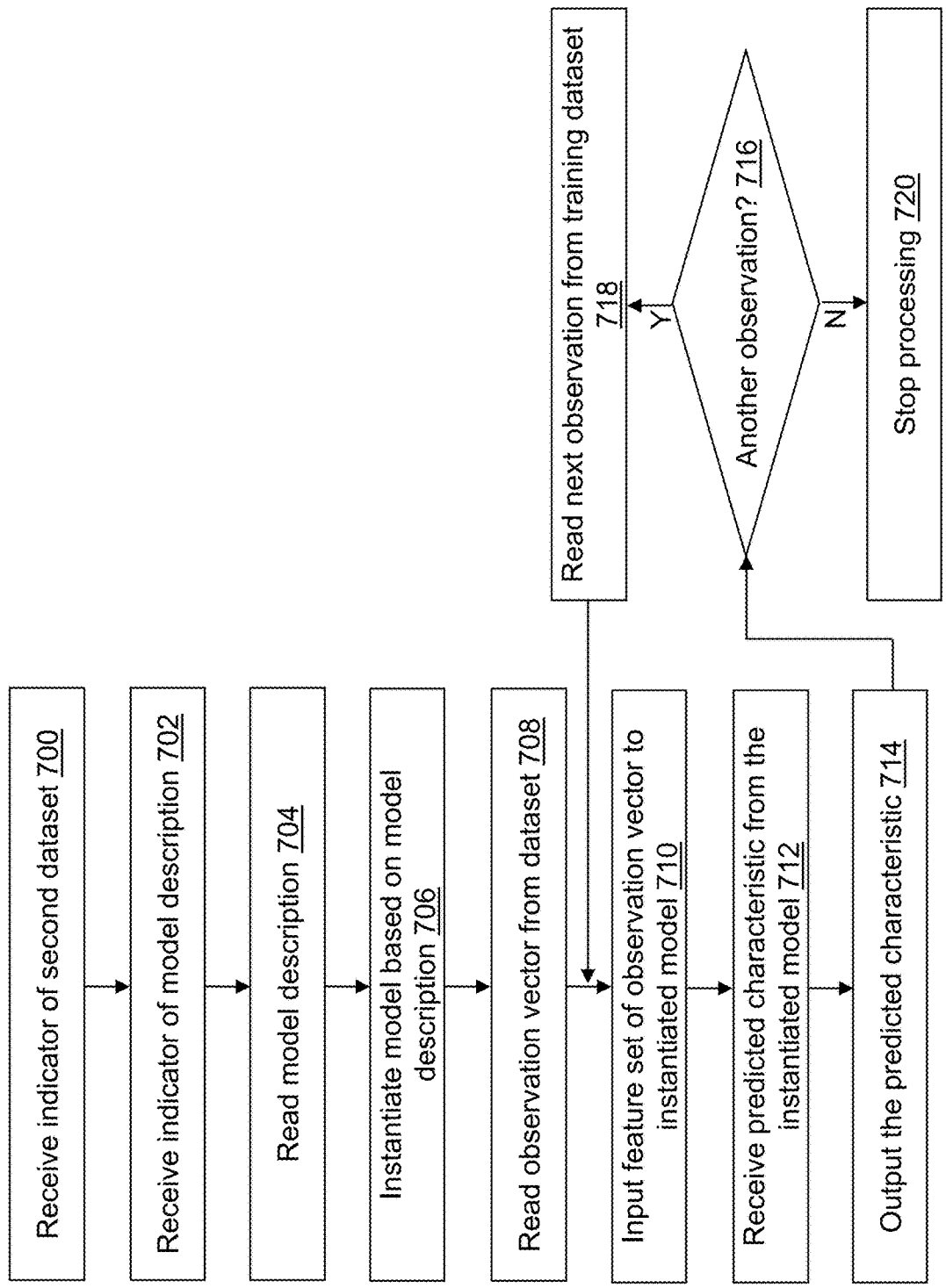
FIG. 7 depicts a flow diagram illustrating examples of operations performed by the prediction device of FIG. 6 in accordance with an illustrative embodiment.

Referring to FIG. 7, example operations of prediction application 622 are described. Additional, fewer, or different operations may be performed depending on the embodiment of prediction application 622. The order of presentation of the operations of FIG. 7 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 700, a tenth indicator may be received that indicates second dataset 624. For example, the tenth indicator indicates a location and a name of second dataset 624. As an example, the tenth indicator may be received by prediction application 622 after selection from a user interface window or after entry by a user into a user interface window. In an alternative embodiment, second dataset 624 may not be selectable. For example, a most recently created dataset may be used automatically.

In an operation 702, an eleventh indicator may be received that indicates tree model description 126 that may include a feature set description that includes a list of the plurality of variables to use in predicting the target variable value using the trained tree model. For example, the eleventh indicator indicates a location and a name of tree model description 126. As an example, the eleventh indicator may be received by prediction application 622 after selection from a user interface window or after entry by a user into a user interface window. In an alternative embodiment, tree model description 126 may not be selectable. For example, a most recently created model configuration data may be used automatically. As another example, tree model description 126 may be provided automatically as part of integration with tree model training application 122.

In an operation 704, a tree model description is read from tree model description 126.

In an operation 706, a tree model is instantiated with the tree model description. For example, the type of model, its hyperparameters, and other characterizing elements are read and used to instantiate a tree model based on the information output from the training process in operation 264 or operation 296.

In an operation 708, an observation vector is read from second dataset 624.

In an operation 710, the observation vector that includes values for each of the plurality of variables to use in predicting the target variable value is input to the instantiated model.

In an operation 712, a predicted target variable value for the read observation vector is received as an output of the instantiated model.

In an operation 714, the predicted may be output, for example, by storing the predicted with the observation vector to predicted dataset 626. In addition, or in the alternative, the predicted may be presented on second display 616, printed on second printer 620, sent to another computing device using second communication interface 606, an alarm or other alert signal may be sounded through second speaker 618, etc.

In an operation 716, a determination is made concerning whether or not second dataset 624 includes another observation vector. When second dataset 624 includes another observation vector, processing continues in an operation 718. When second dataset 624 does not include another observation vector, processing continues in an operation 720.

In operation 718, a next observation vector is read from second dataset 624, and processing continues in operation 710.

In operation 720, processing stops and cleanup is performed as needed.

For additional comparison with existing split based methods, real data from the CORA academic citation dataset was used as input dataset 124. Seven different sets of variables were used to train a forest model type. A base forest model used all 1433 variables included in the CORA academic citation dataset. A PCA forest model used 40 variables selected from the CORA academic citation dataset using principal components analysis. A network forest model used 45 variables created using the centrality, node similarity, community detection, and core decomposition algorithms within the NETWORK procedure. Each algorithm can be run on the entire CORA citation graph, or on individual subgraphs divided by training data label. A network/base forest model used all 1433 variables included in the CORA academic citation dataset plus the 45 variables created using the network algorithm for a total of 1478 variables. A network/PCA forest model used the 40 variables selected from the CORA academic citation dataset using principal components analysis plus the 45 variables created using the network algorithm for a total of 85 variables.

A variable importance was computed using the existing split based method, using operations 234 through 264 of tree model training application 122 (indicated as "leaf-based"), and using operations 270 through 296 of tree model training application 122 (indicated as "betweenness"). The twelve most relevant variables were selected based on the variable importance computed using each method. The existing split based method and the betweenness method identified the same set of twelve variables; whereas, the leaf-based method included ten of the same variables and two different variables in the identified set of twelve most relevant variables. The forest model type was retrained with only variable values for the twelve most relevant variables selected. Comparative results are shown in Table VIII below:

TABLE VIII

| Method (# variables) | Forest classification accuracy | Forest classification accuracy with autotuning |
|---|---|---|
| Base (1433) | 43.4 ± 1.5 | N/A |
| PCA (40) | 44.6 ± 1.6 | 67.9 ± 0.8 |
| Network (45) | 80.6 ± 0.6 | 83.5 ± 0.6 |
| Network/base (1478) | 73.6 ± 1.3 | N/A |
| Network/PCA (85) | 79.6 ± 0.7 | 85.9 ± 0.4 |
| Betweenness & Existing split based (12) | 79.1 ± 0.7 | 86.4 ± 0.5 |
| Leaf-Based (12) | 79.1 ± 0.7 | 85.8 ± 0.5 |

The methods in which only twelve variables were selected resulted in better or similar accuracy. Using fewer variables results in simpler models that are more understandable to the user as well providing faster computation times.

There are applications for tree model training application 122 and/or prediction application 622 in many areas such as process control and equipment health monitoring, image processing and classification, data segmentation, data analysis, etc. Tree model training application 422 provides efficient distributed and parallel computing device implementations for training tree models. The presented results demonstrate improved or comparable model accuracies with significantly faster computing times.

The explosion of digital data is generating many opportunities for big data analytics, which in turn provides many opportunities for training tree models to capitalize on the information contained in the data-to make better predictions that lead to better decisions.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   train a tree based model using a plurality of observation vectors, wherein each observation vector of the plurality of observation vectors includes a value for each variable of a plurality of variables and a target value for a target variable, wherein the tree based model defines a decision tree that includes a root node, a plurality of child nodes, and a plurality of leaf nodes, wherein a split test is associated with the root node and each child node to define a split in observation vectors associated with a respective child node or the root node until a leaf node of the plurality of leaf nodes is reached, wherein a leaf node defines a predicted value for the target value;
   (A) select a next child node from the plurality of child nodes of the decision tree;
   (B) compute a number of observation vectors associated with the selected next child node;
   (C) compute a population ratio value using the computed number of observation vectors associated with the selected next child node;
   (D) identify the plurality of leaf nodes that descends from the selected next child node;
   (E) select a next leaf node from the identified plurality of leaf nodes;
   (F) identify first observation vectors of the plurality of observation vectors associated with the selected next leaf node;
   (G) compute a first impurity value for the identified first observation vectors using an impurity function;
   (H) determine a modified subtree from the decision tree, wherein, in the modified subtree, all of the first observation vectors are associated with the child nodes of the plurality of child nodes that descend directly from the selected next child node to remove an effect of the split test of the selected next child node;
   (I) identify second observation vectors of the plurality of observation vectors associated with the selected next leaf node from the determined modified subtree;
   (J) compute a second impurity value for the identified second observation vectors using the impurity function;
   (K) compute a gain contribution value for the selected next child node using the computed population ratio value, the computed first impurity value, and the computed second impurity value;
   (L) update a node gain value for the selected next child node using the computed gain contribution value for the selected next child node;
   (M) repeat (E) through (L) with each remaining leaf node of the selected next child node as the next leaf node selected in (E);
   (N) update a variable gain value for a variable of the plurality of variables associated with the split test of the selected next child node using the updated node gain value of the selected next child node;
   (O) repeat (A) through (N) with each remaining child node of the plurality of child nodes as the next child node selected in (A);
   (P) select a set of relevant variables based on the updated variable gain value; and
   output the selected set of relevant variables.

2. The non-transitory computer-readable medium of claim 1, wherein the tree based model is selected from the group consisting of a decision tree model, a gradient boosting tree model, and a random forest model.

3. The non-transitory computer-readable medium of claim 1, wherein the tree based model includes a plurality of decision trees, wherein the decision tree is one of the plurality of decision trees.

4. The non-transitory computer-readable medium of claim 1, wherein the computer-readable instructions further cause the computing device to:
   before (A), (Q) select a next tree from a plurality of decision trees defined by the tree based model, wherein the decision tree in (A) is the selected next tree; and
   after (O) and before (P), repeat (Q) and (A) through (O) with each remaining tree of the plurality of decision trees as the next tree selected in (Q).

5. The non-transitory computer-readable medium of claim 4, wherein before (Q), the variable gain value is initialized to zero.

6. The non-transitory computer-readable medium of claim 1, wherein the gain contribution value is computed using $0.5 R(I_2-I_1)$ where R is the population ratio value, $I_1$ is the first impurity value, and $I_2$ is the second impurity value.

7. The non-transitory computer-readable medium of claim 6, wherein the first impurity value is computed using $I_1=I(P)$, where I indicates the impurity function, and P includes the identified first observation vectors.

8. The non-transitory computer-readable medium of claim 7, wherein the second impurity value is computed using $I_2=I(P_i)$, where $P_i$ includes the identified second observation vectors.

9. The non-transitory computer-readable medium of claim 1, wherein the impurity function is selected from the group consisting of a Gini impurity function, an entropy impurity function, a variance impurity function, a chi-square impurity function, and an f-statistic impurity function.

10. The non-transitory computer-readable medium of claim 1, wherein the population ratio value is computed using $R=N_i/N$, where R is the population ratio value, $N_i$ is the number of observation vectors associated with the selected next child node, and N is a number of the plurality of observation vectors.

11. The non-transitory computer-readable medium of claim 1, wherein the node gain value is updated using $G_n=G_n+G_{cv}$, where $G_n$ is the node gain value, and $G_{cv}$ is the gain contribution value.

12. The non-transitory computer-readable medium of claim 11, wherein before (E), $G_n$ is initialized to zero.

13. The non-transitory computer-readable medium of claim 11, wherein the variable gain value is updated using $G_v=G_v+G_n$, where $G_v$ is the variable gain value.

14. The non-transitory computer-readable medium of claim 13, wherein before (A), $G_v$ is initialized to zero.

15. The non-transitory computer-readable medium of claim 1, wherein the set of relevant variables are selected by comparing the updated variable gain value to a predefined relevance threshold value.

16. The non-transitory computer-readable medium of claim 15, wherein the variable is included in the set of relevant variables when the updated variable gain value is greater than or equal to the predefined relevance threshold value.

17. The non-transitory computer-readable medium of claim 1, wherein the selected set of relevant variables are a predefined number of variables that have highest values for the updated variable gain value.

18. The non-transitory computer-readable medium of claim 1, wherein the computer-readable instructions further cause the computing device to:
train a second tree based model using the plurality of observation vectors, wherein each observation vector of the plurality of observation vectors includes a value for each variable of the selected set of relevant variables; and
output the trained second tree based model.

19. The non-transitory computer-readable medium of claim 18, wherein the computer-readable instructions further cause the computing device to:
instantiate a predictive model using the output trained second tree based model;
receive a new observation vector;
compute a characteristic of the received, new observation vector using the instantiated predictive model; and
output the computed characteristic of the new observation vector.

20. The non-transitory computer-readable medium of claim 1, wherein, before (A), the computer-readable instructions further cause the computing device to create a node mask for each child node of the plurality of child nodes, wherein the node mask defines whether each observation of the plurality of observation vectors is included in a first child node or a second child node of a respective child node of the plurality of child nodes.

21. The non-transitory computer-readable medium of claim 20, wherein the first observation vectors associated with the selected next leaf node are identified using the node mask for the selected next leaf node.

22. The non-transitory computer-readable medium of claim 20, wherein the second observation vectors associated with the selected next leaf node are identified using the node mask for the selected next leaf node.

23. The non-transitory computer-readable medium of claim 1, wherein the selected set of relevant variables explain an operation of a system modeled by the trained tree based model.

24. A system comprising:
a processor; and
a computer-readable medium operably coupled to the processor, the computer-readable medium having computer-readable instructions stored thereon that, when executed by the processor, cause the system to
train a tree based model using a plurality of observation vectors, wherein each observation vector of the plurality of observation vectors includes a value for each variable of a plurality of variables and a target value for a target variable, wherein the tree based model defines a decision tree that includes a root node, a plurality of child nodes, and a plurality of leaf nodes, wherein a split test is associated with the root node and each child node to define a split in observation vectors associated with a respective child node or the root node until a leaf node of the plurality of leaf nodes is reached, wherein a leaf node defines a predicted value for the target value;
(A) select a next child node from the plurality of child nodes of the decision tree;
(B) compute a number of observation vectors associated with the selected next child node;
(C) compute a population ratio value using the computed number of observation vectors associated with the selected next child node;
(D) identify the plurality of leaf nodes that descends from the selected next child node;
(E) select a next leaf node from the identified plurality of leaf nodes;
(F) identify first observation vectors of the plurality of observation vectors associated with the selected next leaf node;
(G) compute a first impurity value for the identified first observation vectors using an impurity function;
(H) determine a modified subtree from the decision tree, wherein, in the modified subtree, all of the first observation vectors are associated with the child nodes of the plurality of child nodes that descend directly from the selected next child node to remove an effect of the split test of the selected next child node;
(I) identify second observation vectors of the plurality of observation vectors associated with the selected next leaf node from the determined modified subtree;
(J) compute a second impurity value for the identified second observation vectors using the impurity function;
(K) compute a gain contribution value for the selected next child node using the computed population ratio value, the computed first impurity value, and the computed second impurity value;

(L) update a node gain value for the selected next child node using the computed gain contribution value for the selected next child node;

(M) repeat (E) through (L) with each remaining leaf node of the selected next child node as the next leaf node selected in (E);

(N) update a variable gain value for a variable of the plurality of variables associated with the split test of the selected next child node using the updated node gain value of the selected next child node;

(O) repeat (A) through (N) with each remaining child node of the plurality of child nodes as the next child node selected in (A);

(P) select a set of relevant variables based on the updated variable gain value; and output the selected set of relevant variables.

25. A method of computing a variable relevance using a tree model, the method comprising:

training, by a computing device, a tree based model using a plurality of observation vectors, wherein each observation vector of the plurality of observation vectors includes a value for each variable of a plurality of variables and a target value for a target variable, wherein the tree based model defines a decision tree that includes a root node, a plurality of child nodes, and a plurality of leaf nodes, wherein a split test is associated with the root node and each child node to define a split in observation vectors associated with a respective child node or the root node until a leaf node of the plurality of leaf nodes is reached, wherein a leaf node defines a predicted value for the target value;

(A) selecting, by the computing device, a next child node from the plurality of child nodes of the decision tree;

(B) computing, by the computing device, a number of observation vectors associated with the selected next child node;

(C) computing, by the computing device, a population ratio value using the computed number of observation vectors associated with the selected next child node;

(D) identifying, by the computing device, the plurality of leaf nodes that descends from the selected next child node;

(E) selecting, by the computing device, a next leaf node from the identified plurality of leaf nodes;

(F) identifying, by the computing device, first observation vectors of the plurality of observation vectors associated with the selected next leaf node;

(G) computing, by the computing device, a first impurity value for the identified first observation vectors using an impurity function;

(H) determining, by the computing device, a modified subtree from the decision tree, wherein, in the modified subtree, all of the first observation vectors are associated with the child nodes of the plurality of child nodes that descend directly from the selected next child node to remove an effect of the split test of the selected next child node;

(I) identifying, by the computing device, second observation vectors of the plurality of observation vectors associated with the selected next leaf node from the determined modified subtree;

(J) computing, by the computing device, a second impurity value for the identified second observation vectors using the impurity function;

(K) computing, by the computing device, a gain contribution value for the selected next child node using the computed population ratio value, the computed first impurity value, and the computed second impurity value;

(L) updating, by the computing device, a node gain value for the selected next child node using the computed gain contribution value for the selected next child node;

(M) repeating, by the computing device, (E) through (L) with each remaining leaf node of the selected next child node as the next leaf node selected in (E);

(N) updating, by the computing device, a variable gain value for a variable of the plurality of variables associated with the split test of the selected next child node using the updated node gain value of the selected next child node;

(O) repeating, by the computing device, (A) through (N) with each remaining child node of the plurality of child nodes as the next child node selected in (A);

(P) selecting, by the computing device, a set of relevant variables based on the updated variable gain value; and outputting, by the computing device, the selected set of relevant variables.

26. The method of claim 25, further comprising:

before (A), (Q) selecting, by the computing device, a next tree from a plurality of decision trees defined by the tree based model, wherein the decision tree in (A) is the selected next tree; and after (O) and before (P), repeating, by the computing device, (Q) and (A) through (O) with each remaining tree of the plurality of decision trees as the next tree selected in (Q).

27. The method of claim 26, wherein before (Q), the variable gain value is initialized to zero.

28. The method of claim 25, wherein the gain contribution value is computed using $0.5 R(I_2-I_1)$ where R is the population ratio value, $I_1$ is the first impurity value, and $I_2$ is the second impurity value.

29. The method of claim 28, wherein the first impurity value is computed using $I_1=I(P)$, where I indicates the impurity function, and P includes the identified first observation vectors.

30. The method of claim 29 wherein the second impurity value is computed using $I_2=I(P_i)$, where $P_i$ includes the identified second observation vectors.

* * * * *

UNITED STATES PATENT AND TRADEMARK OFFICE
CERTIFICATE OF CORRECTION

PATENT NO. : 11,093,864 B1
APPLICATION NO. : 17/093826
DATED : August 17, 2021
INVENTOR(S) : Reese It is certified that error appears in the above-identified patent and that said Letters Patent is hereby corrected as shown below:

In the Specification

Column 12, Line 2:
Delete the phrase "SAS Viya™" and replace with --SAS® Viya™--.

Column 13, Line 26-27:
Delete the phrase "$I_G(P) = 1 - \sum_k P_k{}^2$," and replace with --$I_G(P) = 1 - \sum_k P_k^2$,--.

Column 16, Line 19:
Delete the phrase "$P(j)[n] \leftarrow P(j)[n] \text{ A } M_k[n]$" and replace with --$P(j)[n] \leftarrow P(j)[n] \wedge M_k[n]$--.

Column 16, Line 33:
Delete the phrase "$I(P(j)) = 1 - \sum_k P(j)_k{}^2$," and replace with --$I(P(j)) = 1 - \sum_k P(j)_k^2$,--.

Column 16, Line 39:
Delete the phrase "$I_V(P(j)) = -\sum_k \left(\frac{1}{|P(j)_k|^2} \sum_{i \in P}(y_i - P(j)_k)^2\right)$," and replace with --$I_V(P(j)) = -\sum_k \left(\frac{1}{|P(j)_k|^2} \sum_{i \in P}(y_i - P(j)_k)^2\right)$,--.

Column 17, Line 44-45:
Delete the phrase "$I(P_i(j)) = 1 - \sum_k P_i(j)_k{}^2$," and replace with --$I(P_i(j)) = 1 - \sum_k P_i(j)_k^2$,--.

Column 17, Line 46:
Delete the phrase "$I(P_i) = -\sum_k P_i(j) \log_2 P_i(j)$." and replace with --$I(P_i(j)) = -\sum_k P_i(j) \log_2 P_i(j)$.--.

Column 25, Line 10:
Delete the phrase "SAS LASR™" and replace with --SAS® LASR™--.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*